United States Patent
Mori et al.

(10) Patent No.: US 8,768,883 B2
(45) Date of Patent: Jul. 1, 2014

(54) STORAGE APPARATUS AND CONTROL METHOD OF THE SAME

(75) Inventors: Mioko Mori, Yokohama (JP); Hirotaka Nakagawa, Sagamihara (JP); Hironori Emaru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 12/921,636

(22) PCT Filed: Mar. 25, 2010

(86) PCT No.: PCT/JP2010/002123
§ 371 (c)(1),
(2), (4) Date: Sep. 9, 2010

(87) PCT Pub. No.: WO2011/117925
PCT Pub. Date: Sep. 29, 2011

(65) Prior Publication Data
US 2012/0185426 A1    Jul. 19, 2012

(51) Int. Cl.
*G06F 17/30* (2006.01)
(52) U.S. Cl.
USPC .... 707/609; 711/154; 711/170; 707/E17.005; 707/E17.032
(58) Field of Classification Search
USPC .......................................................... 707/609
See application file for complete search history.

(56) References Cited

U.S. PATENT DOCUMENTS

| | | | |
|---|---|---|---|
| 6,003,045 A * | 12/1999 | Freitas et al. ......................... 1/1 |
| 6,032,224 A * | 2/2000 | Blumenau ..................... 711/117 |
| 6,085,086 A * | 7/2000 | La Porta et al. ............ 455/432.3 |
| 6,442,663 B1 * | 8/2002 | Sun et al. ....................... 711/202 |
| 7,580,950 B2 * | 8/2009 | Kavuri et al. ......................... 1/1 |
| 7,627,617 B2 * | 12/2009 | Kavuri et al. ......................... 1/1 |
| 7,831,792 B2 * | 11/2010 | Maruyama et al. ............ 711/165 |
| 8,099,499 B2 * | 1/2012 | Oeda .............................. 709/226 |
| 8,261,031 B2 * | 9/2012 | Tanabe et al. .................. 711/162 |
| 8,402,238 B2 * | 3/2013 | Saito et al. ..................... 711/162 |
| 8,543,778 B2 * | 9/2013 | Emaru et al. ................... 711/154 |
| 8,560,779 B2 * | 10/2013 | Castillo et al. ................. 711/138 |
| 2006/0010169 A1 * | 1/2006 | Kitamura ....................... 707/200 |
| 2007/0113036 A1 * | 5/2007 | Gal-Oz .......................... 711/165 |
| 2007/0198604 A1 * | 8/2007 | Okada et al. ................... 707/202 |
| 2008/0104350 A1 | 5/2008 | Shimizu et al. |
| 2009/0235269 A1 * | 9/2009 | Nakajima et al. ............. 718/104 |
| 2009/0240911 A1 | 9/2009 | Yamada et al. |
| 2009/0249018 A1 | 10/2009 | Nojima et al. |
| 2009/0300285 A1 | 12/2009 | Nagai et al. |
| 2011/0252214 A1 * | 10/2011 | Naganuma et al. ........... 711/170 |
| 2011/0320754 A1 * | 12/2011 | Ichikawa et al. .............. 711/165 |
| 2012/0005435 A1 * | 1/2012 | Emaru et al. ................... 711/154 |

FOREIGN PATENT DOCUMENTS

| | | |
|---|---|---|
| JP | 2007-66259 | 3/2007 |
| JP | 2009/230367 | 10/2009 |
| JP | 2009/238114 | 10/2009 |

* cited by examiner

*Primary Examiner* — Shyue Jiunn Hwa
(74) *Attorney, Agent, or Firm* — Brundidge & Stanger, P.C.

(57) ABSTRACT

A storage management system, if the required response performance of the file is added to the access request from the host computer, compares the required response performance of the file with the response performance of the pool volume assigned to the page. If the response performance of the compared pool volume does not satisfy the required response performance, the storage management system selects a pool volume whose response performance satisfies the required response performance from the pool volumes, migrates the page to the selected pool volume, and stores the data in the page to which the pool volume is assigned.

15 Claims, 38 Drawing Sheets

FIG.7

| HOST NAME | DRIVE NAME | DIRECTORY NAME | FILE NAME | REQUIRED RESPONSE PERFORMANCE (MB/S) |
|---|---|---|---|---|
| HOST1 | E: | APP1 | File1 | 7G |
| HOST1 | F: | APP1 | File2 | 3G |
| HOST1 | E | APP2 | File3 | 0.8G |

FIG. 9

| POOL ID | PAGE ID | POOL VOLUME ID | VIRTUAL VOLUME ID | LBA Range ||
|---|---|---|---|---|---|
| | | | | Start | End |
| POOL1 | 00000 | LDEV1 | V-VOL1 | 13000 | 13999 |
| | 00001 | LDEV1 | V-VOL1 | 01000 | 01999 |

FIG.10

| POOL VOLUME ID | CAPACITY | FREE CAPACITY | MEDIA TYPE | RESPONSE PERFORMANCE (MB/S) |
|---|---|---|---|---|
| LDEV 1 | 500GB | 400GB | SSD | 8G |
| LDEV 2 | 1TB | 200GB | SAS | 4G |
| LDEV 3 | 5TB | 1.2TB | SATA | 1G |

FIG.11

| HOST NAME | DRIVE NAME | DIRECTORY NAME | FILE NAME | REQUIRED RESPONSE PERFORMANCE (MB/S) | LBA Range |
|---|---|---|---|---|---|
| HOST1 | E: | APP1 | File1 | 7G | 00355~00457 00860~00973 |
| HOST1 | F: | APP1 | File2 | 3G | 00055~00099 |
| HOST1 | E | APP2 | File3 | 0.8G | 00546~00746 |

| PAGE ID (23281) | REQUIRED RESPONSE PERFORMANCE (MB/S) (23283) | MIGRATION DESTINATION CANDIDATE POOL VOLUME (23285) | MIGRATION DESTINATION POOL VOLUME (23287) |
|---|---|---|---|
| 00001 | 7G | LDEV 1 | LDEV 1 |
| 00002 | 3G | LDEV 2<br>LDEV 1 | LDEV 2 |
| 00003 | 0.8G | LDEV 3<br>LDEV 2<br>LDEV 1 | LDEV 2 |

| POOL VOLUME NAME (23291) | FREE CAPACITY (23293) |
|---|---|
| LDEV 1 | 400GB |
| LDEV 2 | 200GB |
| LDEV 3 | 1.2TB |

| HOST NAME | DRIVE NAME | DIRECTORY NAME | FILE NAME | LBA Range |
|---|---|---|---|---|
| HOST1 | E: | APP1 | File1 | 00355~00457<br>00860~00973 |
| HOST1 | F: | APP1 | File2 | 00055~00099 |
| HOST1 | E | APP2 | File3 | 00546~00746 |

FIG.23

| HOST NAME | VM NAME | DRIVE NAME | DIRECTORY NAME | FILE NAME | REQUIRED RESPONSE PERFORMANCE (MB/S) |
|---|---|---|---|---|---|
| HOST1 | VM1 | E: | APP1 | File1 | 7G |
| HOST1 | VM1 | F: | APP1 | File2 | 3G |
| HOST1 | VM2 | E | APP2 | File3 | 0.8G |

| HOST NAME | VM NAME | DRIVE NAME | DIRECTORY NAME | FILE NAME | REQUIRED RESPONSE PERFORMANCE (MB/S) | LBA Range |
|---|---|---|---|---|---|---|
| HOST1 | VM1 | E: | APP1 | File1 | 7G | 00355~00457<br>00860~00973 |
| HOST1 | VM1 | F: | APP1 | File2 | 3G | 00055~00099 |
| HOST1 | VM2 | E | APP2 | File3 | 0.8G | 00546~00746 |

FIG.25

| VM NAME | DRIVE NAME | DIRECTORY NAME | FILE NAME | VM LBA Range |
|---|---|---|---|---|
| VM1 | E: | APP1 | File1 | 00300~00402<br>00805~00918 |
| VM1 | F: | APP1 | File2 | 00000~00045 |
| VM1 | E | APP2 | File3 | 00491~00691 |

FIG.26

| VIRTUAL VOLUME NAME | ASSIGNED VIRTUAL MACHINE NAME | ASSIGNED VM DRIVE NAME | VM LBA Range | LBA Range |
|---|---|---|---|---|
| V-VOL1 | VM1 | C DRIVE | 0000~0999 | 3000~3999 |
| V-VOL2 | VM1 | D DRIVE | 1000~1999 | 0000~0999 |
| V-VOL3 | VM2 | C DRIVE | 2000~3999 | 2000~2999 4000~4999 |

FIG.37

| MIGRATION SOURCE FILE INFORMATION 71100 | | | | MIGRATION DESTINATION FILE INFORMATION 71200 | | | |
|---|---|---|---|---|---|---|---|
| HOST NAME | DRIVE NAME | DIRECTORY NAME | FILE NAME | HOST NAME | DRIVE NAME | DIRECTORY NAME | FILE NAME |
| HOST1 | E: | APP1 | File1 | HOST1 | F: | APP1 | File1 |
| HOST1 | F: | APP1 | File2 | HOST1 | E: | APP1 | File2 |
| HOST1 | E | APP2 | File3 | HOST1 | F | APP2 | File3 |
| 71110 | 71120 | 71130 | 71140 | 71210 | 71220 | 71230 | 71240 |

71000

STORAGE APPARATUS AND CONTROL METHOD OF THE SAME

TECHNICAL FIELD

This invention relates to a storage apparatus in which page control is performed by applying Thin Provisioning to a virtual volume to which multiple logical volumes created in storage areas of multiple storage devices whose response rates are different are assigned and the control method of the same.

BACKGROUND ART

In a computer system, for improving the usage efficiency of the storage capacity, the technology by which the storage apparatus dynamically assigns actual storage areas (hereinafter referred to as pages) to logical devices provided to the server computer exists. Hereinafter, the logical device realized as described above is referred to as a virtual volume. There is also a device management method which configures a pool in which multiple media of different performances and bit costs are combined.

The operation of causing a pool configured of multiple logical resources to correspond to the virtual volume and, in accordance with the I/O (input/output) status from the host computer to the data written to the virtual volume, migrating the relevant data from the logical resource (pool volume) which assigns segments (pages) to the virtual volume to the segments of another pool volume is being performed (refer to the Patent Literature 1).

CITATION LIST

Patent Literature

PTL 1: Japanese Unexamined Patent Application Publication No. 2007-66259

SUMMARY OF INVENTION

Technical Problem

According to the conventional technology, the storage management system measures the number of I/Os to the segments (pages) corresponding to the data written to the virtual volume for a specified period of time and, from the result of the measurement, the segment (page) with a small number of I/Os is migrated to the logical volume (pool volume) configured of low-speed media. Therefore, a segment (page) storing the actual data of a file which, despite the low I/O frequency, requires the high-speed response is, due to the small number of I/Os, migrated to a pool volume with a small access frequency per unit of time (IOPS) (small MB/s).

As a result, when an application actually uses the file, if the actual data of the file is stored in the logical volume configured of low-speed media, the file read performance does not satisfy the required response performance (MB/s), and may delay the operation of the application.

This invention was devised in view of the problems of the conventional technology, and its object is to provide a storage apparatus capable of constantly allocating pages for storing the actual data of a file to which a required response performance is provided in a pool volume which satisfies the required response performance, and the control method of the storage apparatus.

Solution to Problem

For achieving the purpose, this invention is characterized by receiving an access request from an access request terminal as the access request source, if the access request includes a required response performance which is required of the file, comparing the required response performance with the response performance of a first pool volume assigned to the page for storing the actual data of the file specified by the access request, on condition that the response performance of the first pool volume does not satisfy the required response performance, from multiple pool volumes, selecting a pool volume whose response performance satisfies the required response performance, causing the selected pool volume to be a second pool volume, migrating the page assigned to the first pool volume to the second pool volume, and storing the actual data of the file in the page which is migrated to the second pool volume.

Advantageous Effects of the Invention

According to this invention, pages for storing the actual data of a file to which a required response performance is provided can be constantly allocated in a pool volume which satisfies the required response performance, and the processing delay or termination of an application can be prevented.

BRIEF DESCRIPTION OF DRAWINGS

FIG. 7 is a configuration diagram showing a configuration example of the user input or the input information sent from the file management system in the host computer to the storage management system in the storage apparatus in the first embodiment.

FIG. 9 is a configuration diagram showing a configuration example of a pool management table which the storage management system in the first embodiment comprises.

FIG. 10 is a configuration diagram showing a configuration example of a pool volume management table which the storage management system in the first embodiment comprises.

FIG. 11 is a configuration diagram showing a configuration example of a file required response performance list created by the storage management system in the first embodiment.

FIG. 12 is a configuration diagram showing a configuration example of a migration candidate page list created by the storage management system in the first embodiment.

FIG. 13 is a configuration diagram showing a configuration example of a pool volume free capacity estimation table created by storage management system in the first embodiment.

FIG. 15 is a configuration diagram showing a configuration example of an LBA Range information table which the host computer in the first embodiment comprises.

FIG. 23 is a configuration diagram showing a configuration example of the input information in the first embodiment.

FIG. 24 is a configuration diagram showing a configuration example of a VM file required response performance list created by the storage management system in the first embodiment.

FIG. 25 is a configuration diagram showing a configuration example of a VM LBA Range information table which a guest OS of the host computer in the first embodiment comprises.

FIG. 26 is a configuration diagram showing a configuration example of a VM volume management table which a host OS of the host computer in the first embodiment comprises.

FIG. 37 is a configuration diagram showing a configuration example of file migration information created by the file classification management system in the third embodiment.

DESCRIPTION OF EMBODIMENTS

First Embodiment

The first embodiment compares the required response performance (required response time) of a file with the response time set for the first pool volume assigned to the page for storing the actual data of the file and, if the response time set for the first pool volume does not satisfy the required response time, migrates the page divided from the first pool volume to the page divided from the second pool volume which satisfies the required response time.

Figure 1:
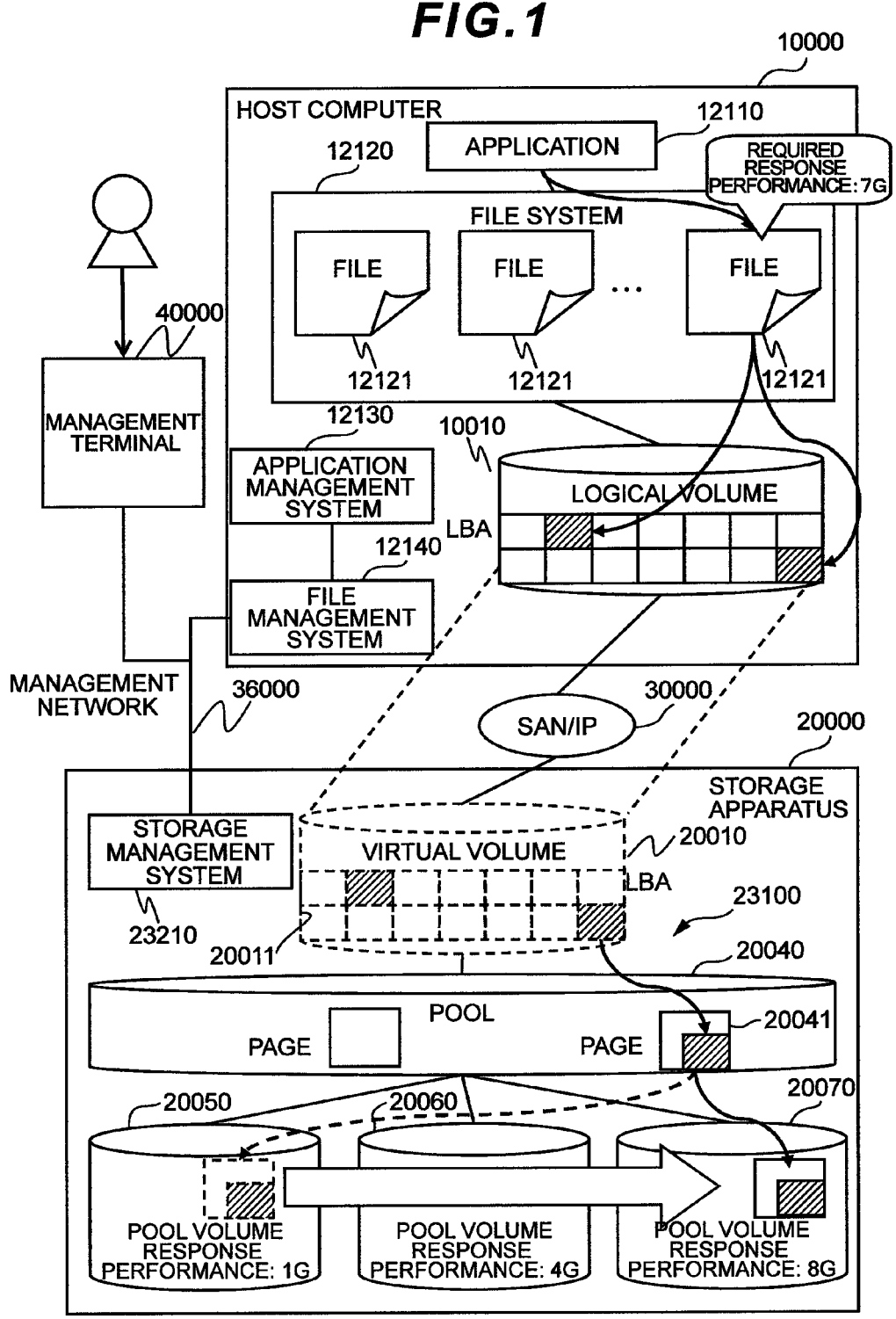
FIG. 1 is a conceptual diagram showing the concept of the computer system in this invention.

FIG. 1 shows the conceptual diagram in the first embodiment. In FIG. 1, the storage apparatus 20000 is connected to a host computer 10000 via a communication network (first communication network) 300000 and also connected to the host computer 10000 and a management terminal 40000 via a management network (second communication network).

The storage apparatus 20000 comprises a microprocessor (MP) 23100 functioning as a controller which starts up the storage management system 23210 and performs the integrated control of the entire storage apparatus 20000.

This MP 23100, as well as providing a virtual volume 20010 comprising a virtual storage area to the host computer 10000 as a logical volume 10010, manages the virtual volume 20010 as the access target of the host computer 10000, divides the virtual storage area of the virtual volume 20010 into multiple blocks 20011, sets each block 20011 as a page 20041 for storing the actual data of the file which is the access target of the access request source, for example, the host computer 10000, manages the pool 20040 including the multiple pages 20041, at the same time, manages the response time of multiple types of storage devices whose performances, for example, the response time [values] as the response performances, are different by associating the same with multiple logical volumes created in the respective types of storage devices and, in response to access requests from the access request source, assigns the storage area from the logical volume created in any type of the storage device among the multiple logical volumes created in the respective types of storage devices to each page 20041 as the pool volumes 20050, 20060, and 20070.

At this point, the MP 23100, if receiving an access request including the input information by the user's operation from the management terminal 40000 as the access request source or an access request whose access target is the file which an application 12110 in the host computer 10000 utilizes and, at the same time, which is stored in the logical volume 10010 provided by the storage apparatus 20000 from the host computer 10000 which is the access request source, and if the required response performance of the file is added to the received access request, compares the required response performance of the file (required response time 7 GB/s) with the response time of the storage device (1 GB/s) set for the pool volume 20050 assigned to the page 20041.

At this time, if the response time of the compared pool volume 20050 does not satisfy the required response time, the MP 23100 selects a pool volume whose response time satisfies the required response time from the pool volumes, causes the selected pool volume, for example, to be the pool volume 20070 configured of storage devices of the response performance 8 GB/s, a new pool volume, assigns the new pool volume 20070 to the page 20041, that is, migrates the data of the page assigned to the pool volume 20050 to the pool volume 20070, stores the actual data of the file to the page 20041 assigned to the pool volume 20070, and inhibits the actual data of the file from being stored in the page assigned to the pool volume 20050.

Specifically, the MP 23100 compares the required response performance of the file (required response time 7 GB/s) with the response time of the storage device (1 GB/s) set for the pool volume 20050 assigned to the page 20041 and, if the response time of the compared pool volume 20050 does not satisfy the required response time, migrates the page divided from the pool volume 20050 to the page divided from the pool volume 20070 configured of storage devices whose response time satisfies the required response time (response performance 8 GB/s), and changes the storage destination of the actual data of the file from the pool volume 20050 to the pool volume 20070.

Figure 2:
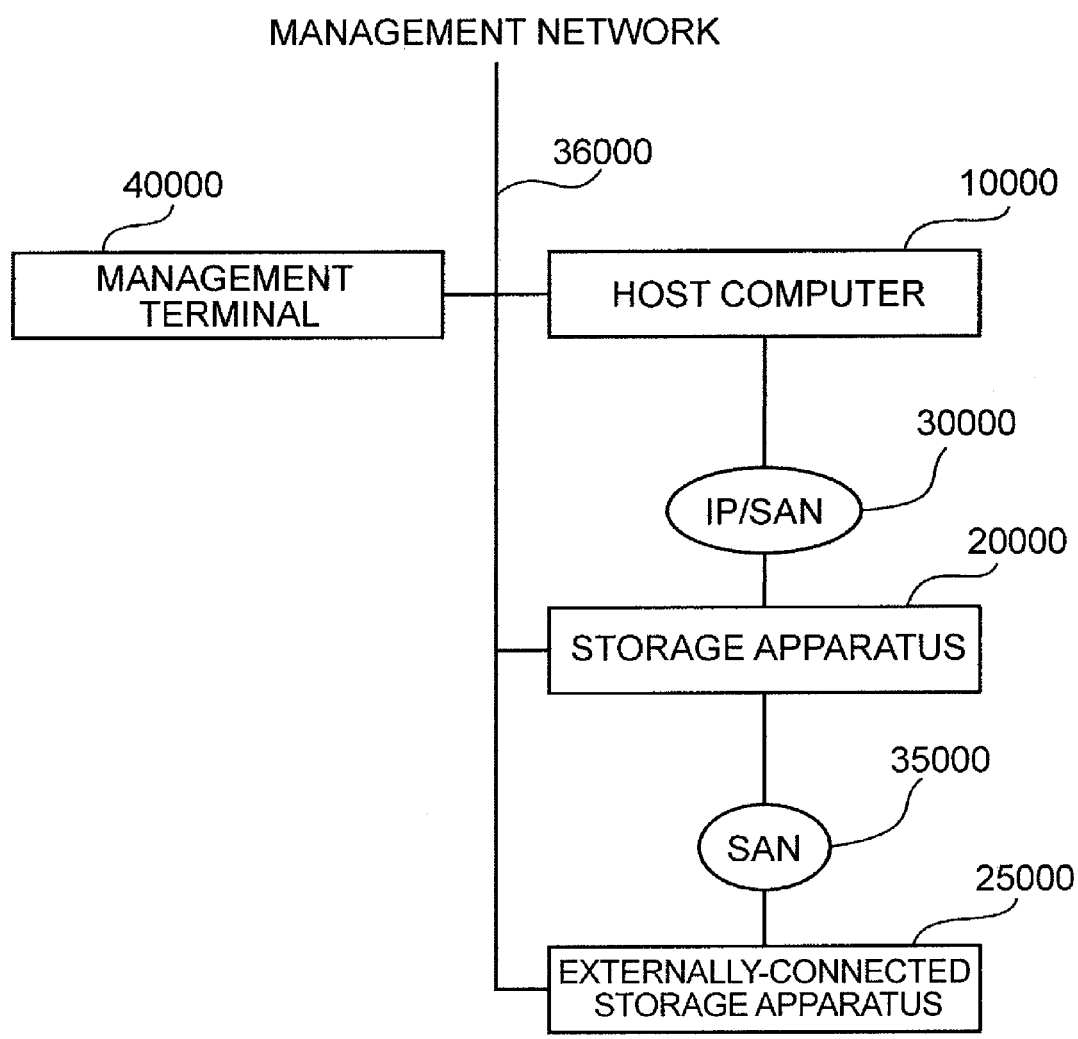
FIG. 2 is a configuration diagram showing a configuration example of the computer system in this invention.

FIG. 2 shows a configuration example of the computer system. The host computer 10000 and the storage apparatus 20000 are connected via an IP (Internet Protocol)/SAN (Storage Area Network) 30000, and the storage apparatus 20000 provides a virtual volume 20010 to the host computer 10000. Furthermore, the storage apparatus 20000 and an externally-connected storage apparatus 25000 are connected via a SAN 35000, and the storage apparatus 20000 comprises a function of using the logical volume in the externally-connected storage apparatus 25000 as a local logical volume 25010. The host computer 10000, the storage apparatus 20000, and the management terminal 40000 are connected via a management network 36000 to enable the communication among the respective apparatuses.

Note that the IP/SAN 30000, the SAN 35000, and the management network 36000 may also be the same network. Furthermore, the administrator of each apparatus performs the operation of each apparatus by using the management terminal 40000 connected to the management network 36000. The management system which each apparatus comprises provides a management screen and a console to the management terminal 40000.

Figure 3:
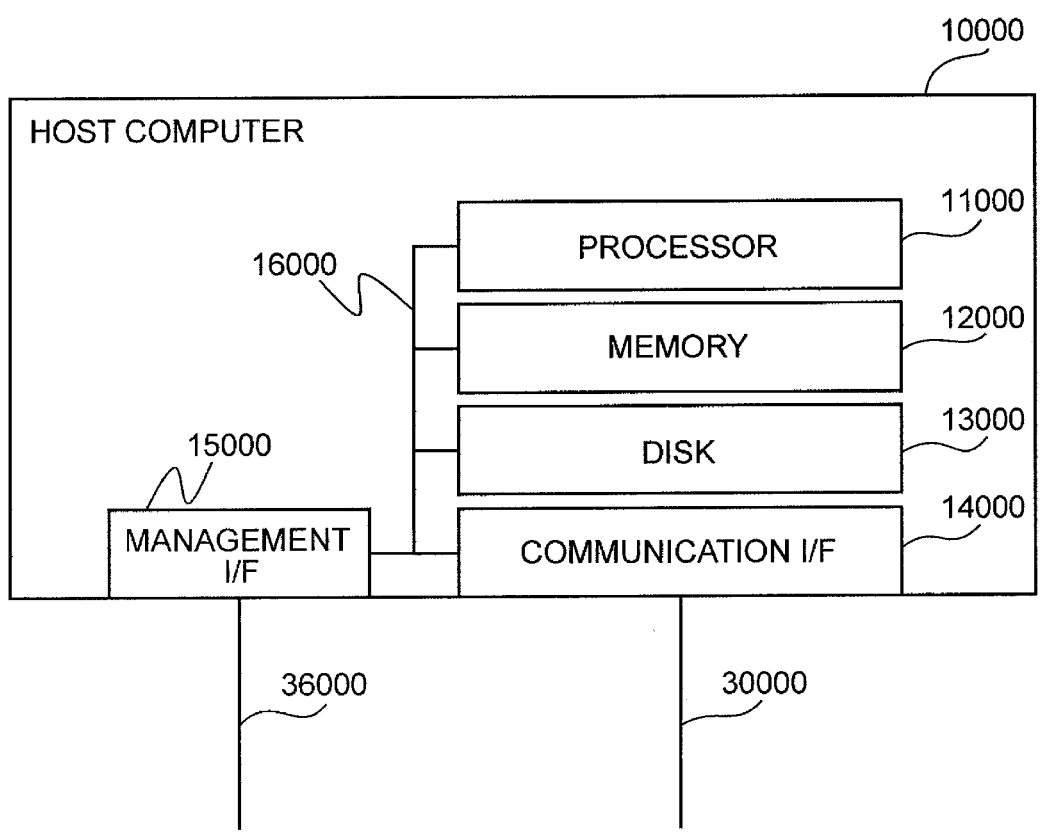
FIG. 3 is a configuration diagram showing a physical configuration example of the host computer in this invention.

FIG. 3 shows a detailed configuration example of the host computer 10000. The host computer 10000 comprises a processor 11000, a memory 12000, a disk 13000, a communication I/F 14000, and a management I/F 15000, which are connected to each other via an internal network 16000 to enable mutual communication. Furthermore, the processor 11000 controls the application software stored in the disk 13000 by using the memory 12000. The communication I/F 14000 is connected to the storage apparatus 20000 via the IP/SAN 30000, and retrieves the virtual volume 20010 in the storage apparatus 20000 as a logical volume 10010. The management I/F 15000 provides a management screen and a console to the management terminal 40000 via the management network 36000. Furthermore, the management I/F 15000 can communicate with the storage apparatus 20000 for the management information via the management network 36000.

Figure 4:
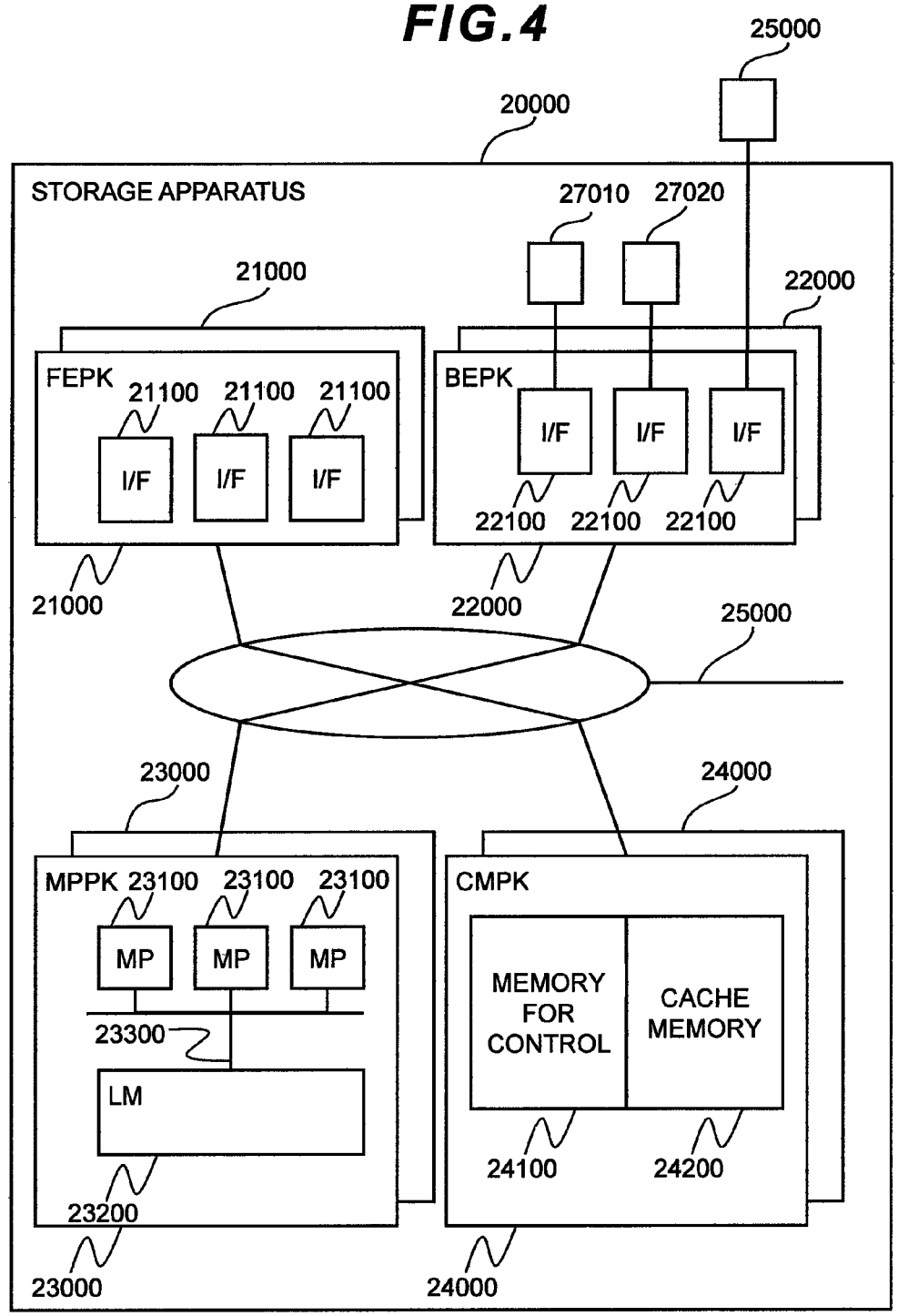
FIG. 4 is a configuration diagram showing a physical configuration example of the storage apparatus in this invention.

FIG. 4 shows a detailed configuration example of the storage apparatus 2000. The storage apparatus 2000 comprises a host I/F unit (FEPK: FrontEnd PacKage) 21000, a media I/F unit (BEPK: BackEnd PacKage) 22000, a control unit (MPPK: Micro Processor PacKage) 23000, and a shared memory unit (CMPK: Cache Memory PacKage) 24000, which are connected to each other via an internal network 25000 to enable mutual communication.

The FEPK 21000 comprises multiple host I/Fs 21100, is connected to the host computer 10000 via the IP/SAN 30000, also connected to the internal network 25000, and intermediates the reception and sending of the data as the read or write processing target between the host computer 10000 and the logical volume 10010.

Furthermore, the BEPK 22000 comprises multiple media I/Fs 22100, is connected to an SSD 27010 and an HDD 27020 via cables, and is also connected to the externally-connected storage apparatus 25000 via the SAN 35000. Furthermore, the BEPK 22000 is connected to the internal network 25000, and intermediates the reception and sending of the data as the read or write processing target between the side of the internal network 25000 and a Solid State Drive (SSD) 27010 and an HDD (hard disk drive) 27020 as examples of storage devices or storage apparatuses and the logical volume 25010 in the externally-connected storage apparatus 25000.

Although two types of storage devices or storage apparatuses whose performances, for example, the response time values as the response performances are different are shown, in addition to the same, SAS (Serial Attached SCSI) Disks, SATA (Serial ATA) Disks, FC (Fibre Channel) Disks, and others can also be used.

The CMPK 24000 comprises a information control memory 24100 and a data cache memory 24200, wherein the information control memory 24100 stores the information required for the processing, for example, media configuration information, and the data cache memory 24200 temporarily stores (caches) the HDD 27020, the data to be written to the HDD 27020, or the data read from the HDD 27020. The data cache memory 24200 and the control information memory 24100 may also be volatile memories, for example, DRAM (Dynamic Random Access Memory).

The MPPK 23000 comprises multiple MPs (Micro Processors) 23100 and a local memory (LM) 23200, wherein the MPs 23100 and the local memory (LM) 23200 are connected via a bus 23300, and the LM 23200 stores part of the control information stored in the control information memory 24100.

The MP 23100 sets a logical storage area (parity group) configured of multiple media (storage devices) of the same type, divides a part of the parity group as an LDEV (Logical DEVice) indicating the logical storage area, configures a pool 20040 compiling the multiple LDEVs as a logical storage area (the LDEVs configuring the pool are hereinafter referred to as pool volumes), divides a virtual volume 20010 whose actual capacity is 0 from the pool 20040, and provides the same to the host computer 10000. The host computer 10000 uses the provided virtual volume 20010 as the logical volume 10010. If the write processing is performed for the virtual volume 20010 by the host computer 10000, the MP 23100, if no page is assigned to the virtual volume 20010, assigns a page 20041 from the pool 20040.

Figure 5:
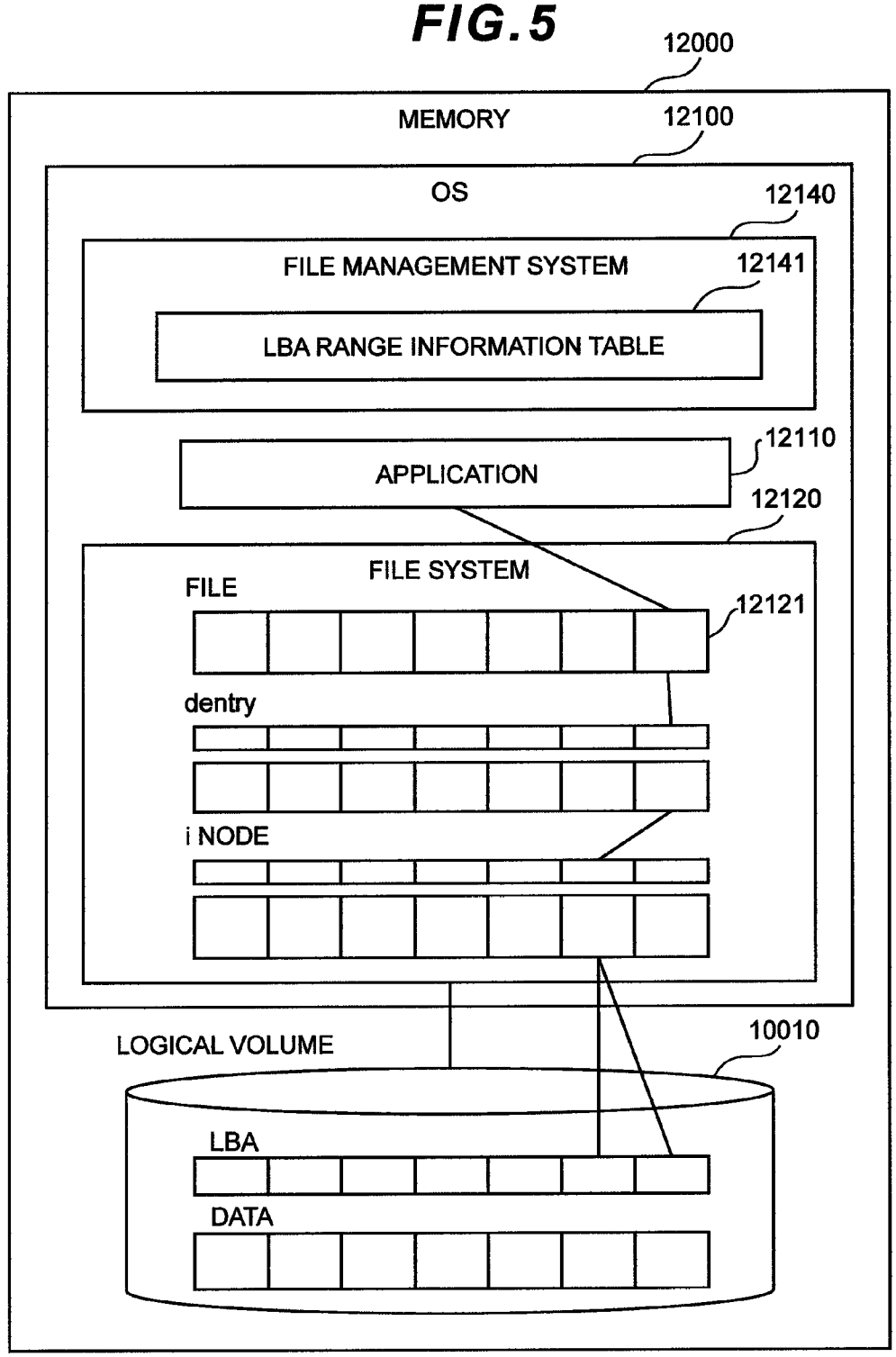
FIG. 5 is a configuration diagram showing a logical configuration example of a memory of the host computer in the first embodiment.

FIG. 5 shows a logical configuration example in the memory 12000 of the host computer 10000. The processor 11000 starting up the file management system 12140, using the logical volume 10010 provided from the storage apparatus 20000 which the file management system 12140 of the operation system (OS: Operation System) 12100 manages, stores the file 12121 which the application 12110 uses in the memory 12000. Furthermore, the file management system 12140 comprises the LBA Range information table 12141 which manages the LBA which stores the file 12121. The details of the LBA Range information table 12141 are described later.

Figure 6:
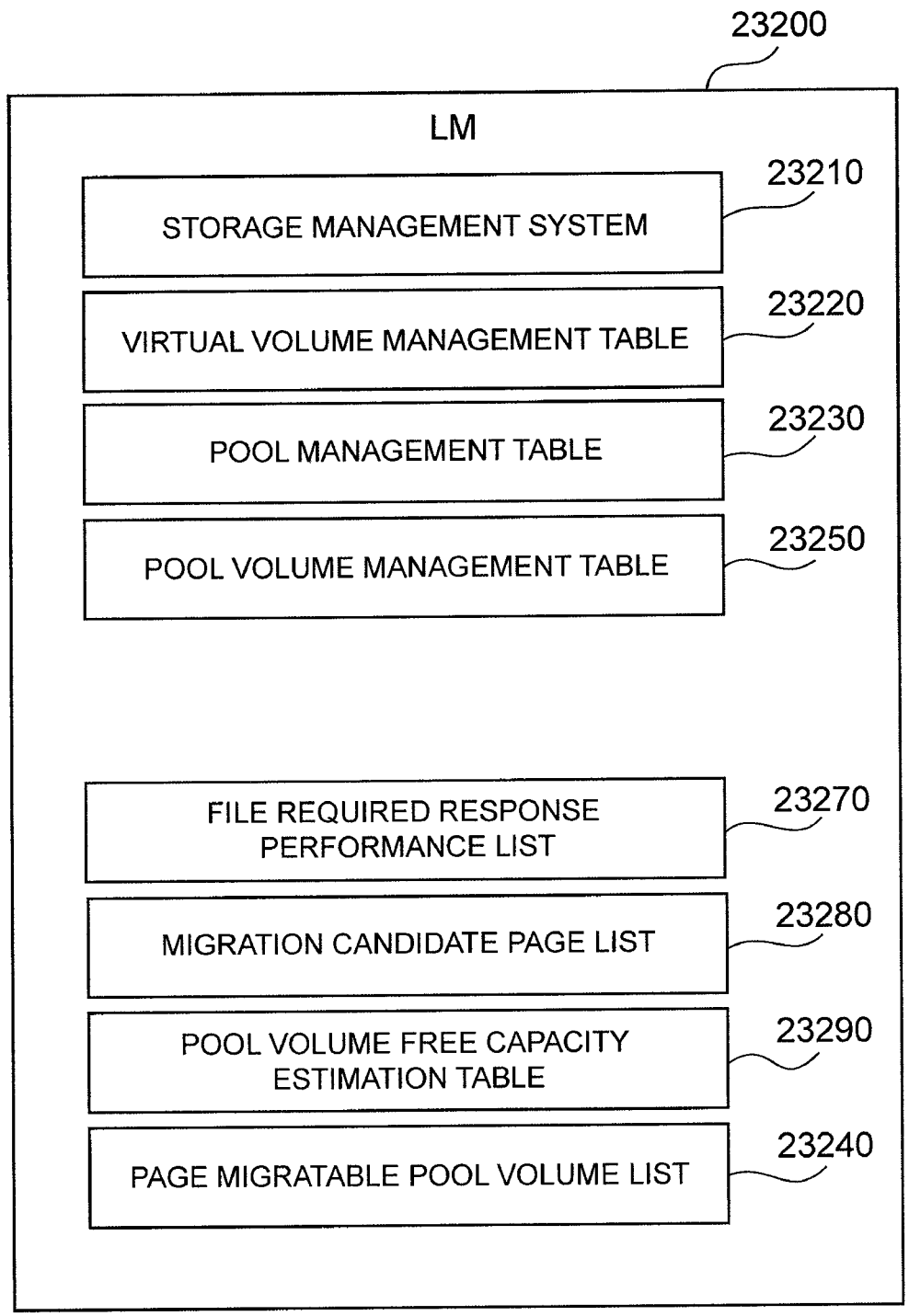
FIG. 6 is a configuration diagram showing a logical configuration example of an LM of the storage apparatus in the first embodiment.

FIG. 6 shows a logical configuration example of the LM 23200 in the MPPK 23000. The MP 23100 starting up the storage management system 23210, for performing the migration control of pages in the storage apparatus 20000, generates a file required response performance list 23270, a migration candidate page list 23280, and a pool volume free capacity estimation table 23290, and uses a virtual volume management table 23220, a pool management table 23230, a pool volume management table 23250, and a page migratable pool volume list 23240.

The details of the file required response performance list 23270, the migration candidate page list 23280, the pool volume free capacity estimation table 23290, the virtual volume management table 23220, the pool management table 23230, the pool volume management table 23250, and the page migratable pool volume list 23240 are described later.

FIG. 7 shows an example of the input information utilized in the flow disclosed in this embodiment which is the input information 50000 by the user's operation or the input information 50000 sent from the file management system 12140 in the host computer 10000 to the storage management system 23210 in the storage apparatus 20000. The MP 23100 starting up the storage management system 23210, as the input information 50000 from the access request source, receives a host name 51000, a drive name 53000, a directory name 54000, a file name 55000, and a required response performance 52000 for the relevant file. Note that, hereinafter, the processing by the MP 23100 starting up the storage management system 23210 may also be described as the processing by the storage management system 23210.

Figure 8:
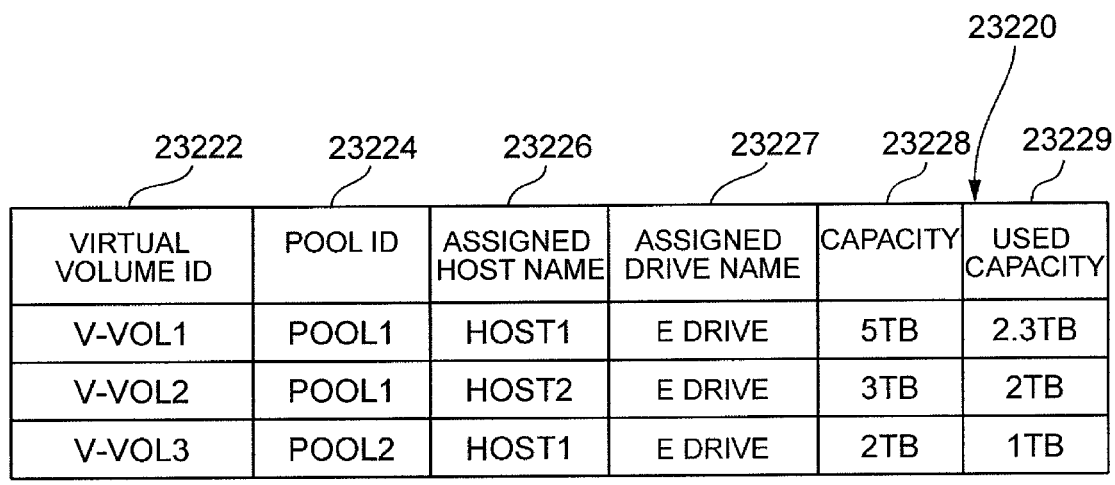
FIG. 8 is a configuration diagram showing a configuration example of a virtual volume management table which the storage management system in the first embodiment comprises.

FIG. 8 shows a configuration example of the virtual volume management table 23220 which the storage management system 23210 comprises. The virtual volume management table 23220 is configured of a virtual volume ID field 23222 to be the ID by which a virtual volume 20010 can be uniquely identified in the storage apparatus 20000, a pool ID field 23224 to be the name of a pool 20040 made to correspond to the virtual volume 20010, an assigned host name field 23226 to be the ID by which a host computer 10000 to which the virtual volume (logical volume) 10010 is assigned can be uniquely identified in the computer system, an assigned drive name field 23227 to be the drive name assigned in the host computer 10000, a capacity field 23228 to be the capacity of the virtual volume, and a used capacity field 23229 indicating the capacity assigned to the virtual volume 20010.

If a virtual volume 20010 is created by the administrator of the storage apparatus 20000, the storage management system 23210 registers the information of the virtual volume 20010 created in the virtual volume name field 23222, the pool name field 23224, and the capacity field 23228 in the virtual volume management table 23220. Furthermore, if the virtual volume 20010 is assigned to the host computer 10000 by the administrator, the storage management system 23210 registers the host name, the assigned drive name, and the used capacity in the assigned host field 23226, the assigned drive name field 23227, and the used capacity field 23229 in the virtual volume management table 23220. Note that the used capacity field 23229 is updated by the storage management system 23210 to the latest information regularly or when the flow disclosed in this invention is started.

FIG. 9 shows a configuration example of the pool management table 23230 used by the storage management system 23210. The pool management table 23230 includes a pool ID field 23231 to be the ID by which the storage management system 23210 can uniquely identify a pool 20040 to be the management target in the storage apparatus 20000, a page ID field 23232 to be the ID by which a page 20041 which is the actual storage area of the virtual volume 20010 can be uniquely identified in the pool, a pool volume ID field 23235 to be the ID by which a logical volume (pool volume 20050, 20060, or 20070) configuring the pool 20040 can be uniquely identified in the storage apparatus 20000, a virtual volume ID field 23237 to be the ID by which a logical volume (pool volume 20050, 20060, or 20070) to which the page 20041 is assigned can be uniquely identified in the storage apparatus 20000, and an LBA Range field 23238 indicating the range of the LBA of the logical volume (pool volume 20050, 20060, or 20070) stored in the relevant page 20041.

If a pool 20040 is created by the administrator of the storage apparatus 20000, the storage management system 23210 registers the ID of the pool 20040 created in the pool ID field 23231 in the pool management table 23230 and, if a pool volume (e.g. one pool volume of the pool volumes 20050, 20060, and 20070) is assigned to the pool 20040 by the administrator of the storage apparatus 20000, allocates the ID by which the page 20041 configuring the pool 20040 can be uniquely identified to the page ID field 23232, and registers the ID of the pool volume assigned to the pool 20040 (e.g. one pool volume of the pool volumes 20050, 20060, and 20070) in the pool volume ID field 23235. Furthermore, if a virtual volume 20010 is divided by the storage administrator, the storage management system 23210 registers the ID of the divided virtual volume in the virtual volume name field 23237 in the pool management table 23230.

Furthermore, if any write is performed by the host computer 10000 for the virtual volume 20010 and if no page is assigned yet, the storage management system 23210 assigns a page 20041 from the pool 20040 to the virtual volume 20010, and registers the starting number of the LBA of the virtual volume 20010 to which the page 20041 is assigned in the START field 23243 in the LBA Range field and the ending number in the END field 23244 in the LBA Range field.

FIG. 10 shows a configuration example of the pool volume management table 23250 used by the storage management system 23210. The pool volume management table 23250 is configured of a pool volume ID field 23251 to be the ID by which a logical volume (pool volume 20050, 20060, or 20070) configuring the pool 20040 can be uniquely identified in the storage apparatus 20000, a capacity field 23252 to be the capacity of the pool volume 20050, 20060, or 20070, a free capacity field 23253 indicating the free capacity of the pool volume 20050, 20060, or 20070, a media type field 23255 indicating the type of the media (storage devices) configuring the pool volume 20050, 20060, or 20070, and a response performance field 23257 in which the response performance value (MB/s) provided by the pool volume 20050, 20060, or 20070 is registered.

Furthermore, the response performance varies depending on the type of the media configuring the pool volume and the configuration RAID level and, as for the value of the response performance field 23257, when the pool volume is created, the administrator or the storage management system 23210 registers the catalog value based on the media type and the configuration RAID level.

If a pool volume (e.g. one pool volume of the pool volumes 20050, 20060, and 20070) is assigned to the pool 20040 by the administrator of the storage apparatus 20000, the storage management system 23210 registers all the information of the pool volume assigned to the pool 20040 in the pool volume ID field 23251, the capacity field 23252, the media type field 23255, the response performance field 23257 in the pool volume management table 23250. Furthermore, the free capacity field 23253 is updated by the storage management system 23210 when the flow disclosed in this invention is started.

FIG. 11 shows an configuration example of the file required response performance list 23270 created by the storage management system 23210. The file required response performance list 23270 is configured of a host name field 23271 in which the ID by which a host computer 10000 can be uniquely identified in the computer system is registered, a drive name field 23276 in which the ID by which a logical drive can be uniquely identified in the host computer 10000 is registered, a directory name field 23277 in which the name of a directory where the file is stored is registered, a file name field 23278 in which the name of the file which the application utilizes is registered, a required response performance field 23273 in which the response performance required of the relevant file is registered, and an LBA Range field 23275 to which the location where the actual data of the relevant file is stored in the logical volume storing the relevant file, that is, the relevant address in the LBA (Logical Block Addressing) (hereinafter referred to as the LBA Range), is registered.

If the input information 50000 by the user's operation or the input information 50000 sent from the file management system 12140 in the host computer 10000 to the storage management system 23210 in the storage apparatus 20000 is received by the storage management system 23210, the storage management system 23210 registers the received information in the host name field 23271, the drive name field 23276, the directory name field 23277, the file name field 23278, and the required response performance field 23273 in the file required response performance list 23270 respectively.

Furthermore, the storage management system 23210 acquires the LBA Range where the file 12121 is stored from the file management system 12140 in the host computer 10000, and registers the acquired LBA Range in the LBA Range field 23275 of the file required response performance list 23270.

FIG. 12 shows a configuration example of the migration candidate page list 23280 created in the flow of this embodiment. The migration candidate page list 23280 is configured of a page ID field 23281 in which the ID by which a page 20041 as the migration target (that is, the target of this flow disclosed in this embodiment) is uniquely identified is registered, a required response performance field 23283 in which the required response performance required of the relevant page 20041 is registered, a migration destination candidate pool volume field 23285 in which the ID by which a pool volume to be the migration destination candidate of the page 20041 can be uniquely identified in the storage apparatus is registered, and a migration destination pool volume field 23287 in which the ID by which a pool volume to be the migration destination to actually migrate the page 20041 can be uniquely identified in the storage apparatus is registered.

Figure 13:
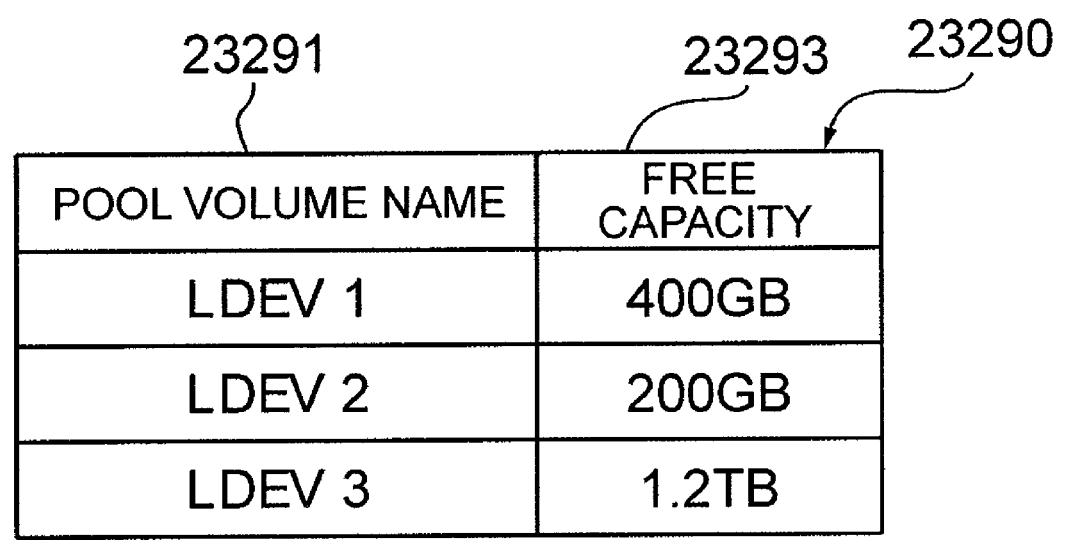

FIG. 13 shows a configuration example of the pool volume free capacity estimation table 23290 created in the flow of this embodiment. The pool volume free capacity estimation table 23290 includes a pool volume name field 23291 to be the pool volume name of a pool volume 20050, 20060, or 20070 configuring the pool 20040 and a free capacity field 23293 to be the free capacity of the pool volume 20050, 20060, or 20070.

Figure 14:
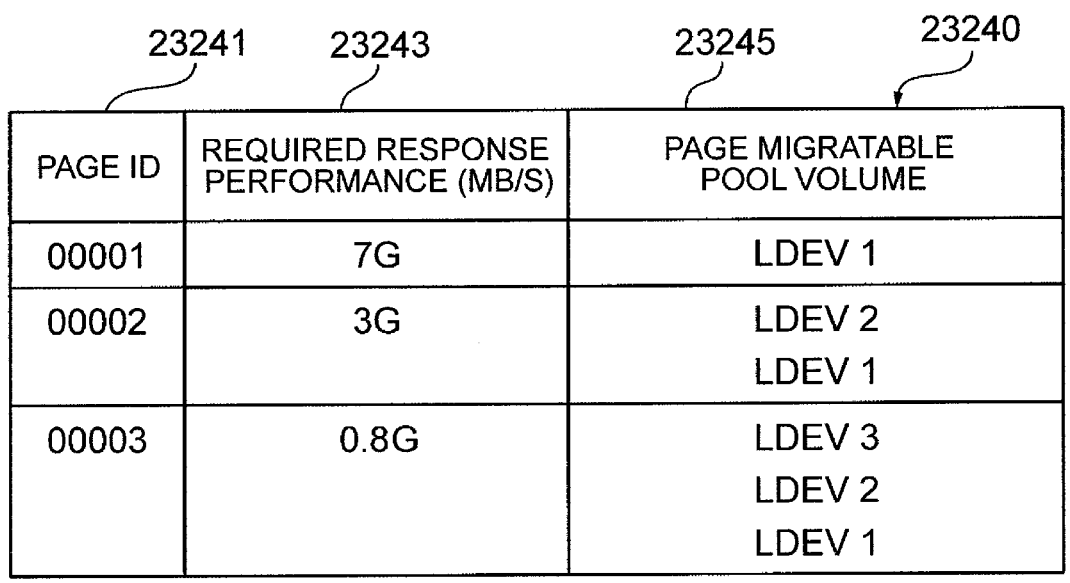
FIG. 14 is a configuration diagram showing a configuration example of a page migratable pool volume list created by storage management system in the first embodiment.

FIG. 14 shows a configuration example of the page migratable pool volume list 23240 created in the flow of this embodiment. The page migratable pool volume list 23240 includes a page ID field 23241 to be the ID by which a page 20041 as the migration target is uniquely identified, a response performance field 23243 to be the required response performance of the relevant page 20041, and a migratable pool volume field 23245 indicating a pool volume to which the relevant page 20041 can be migrated.

In this case, for example, a page 20041 whose page ID 23241 is "00001," whose required response performance is 7 G (MB/s) while the response performance of an LDEV1 (the response performance of the SSD) is 8 G (MB/s), can be migrated to the LDEV 1. A page 20041 whose page ID 23241 is "00002," whose required response performance is 3 G (MB/s) while the response performance of the LDEV1 and an LDEV2 (the response performance of the SSD and the SAS) is 4 G (MB/s) or larger, can be migrated to the LDEV1 and the LDEV2. Meanwhile, a page 20041 whose page ID 23241 is "00003," whose required response performance is 0.8 G (MB/s) while the response performance of the LDEV1, the LDEV2, and an LDEV3 (the response performance of the SSD, the SAS, and the SATA) is 1 G (MB/s) or larger, can be migrated to the LDEV1, the LDEV2, and the LDEV3.

FIG. 15 shows a configuration example of the LBA Range information table 12141 which the host computer 10000 comprises. The LBA Range information table 12141 includes a host name field 12143 to be the information for uniquely identifying a file 12121, a drive name field 12146, a directory name field 12147, a file name field 12148, and an LBA Range field 12145 indicating the range where the relevant file 12121 is stored.

The file management system 12140, when writing data to the logical volume 10010, registers the host name field 12143, the drive name field 12146, the directory name field 12147, and the file name field 12148 in the LBA Range information table 12141 as the information for uniquely identifying the written file 12121, and registers the LBA of the logical volume 10010 where the relevant file 12121 is stored in the LBA Range field 12145.

This embodiment provides the method in which the storage management system 23210, from a host computer 10000 to which a virtual volume 20010 is assigned, acquires the required response performance of a file 12121 stored in the relevant virtual volume 20010, acquires the LBA Range in the virtual volume (the logical volume 10010 in the host computer) 20010 of the relevant file 12121 from the relevant host computer 10000, extracts a page 20041 configuring the virtual volume 20010 and the required response performance of the page 20041 from the required response performance of the acquired file 12121 and the acquired LBA Range, identifies a pool volume (e.g. pool volume 20050, 20060, or 20070) satisfying the required response performance of the extracted page 20041, migrates the extracted page 20041 to the identified pool volume and, after the page migration, inhibits the page migration to the pool volume which does not satisfy the required response performance. Hereinafter, the details of the method are described by using the flowcharts shown in FIGS. 16 to 22.

In this embodiment, the storage management system 23210 starts the processing complying with the reception of the input information 50000 by the user operating the management terminal 40000 or added to the access request from the file management system 12140 in the computer (F0000). Next, the storage management system 23210 extracts the host name, the drive name, the directory name, the file name, and the required response performance from the input information 50000 shown in FIG. 7 (F0010), and registers the information extracted at step F0010 to the file required response performance list 23270 shown in FIG. 11 (F0015).

Next, in the processing of Loop 1 at steps F0020 to F0120, the storage management system 23210 identifies a page 20041 storing the actual data of the file registered in the file required response performance list 23270, and ascertains the required response performance of the relevant page 20041.

As more specifically described, the storage management system 23210 selects a file a from the file required response performance list 23270 (one file among multiple files 12121 is simply referred to as the file a) (F0020), and sends a notification request for the LBA Range to the file management system 12140 in the host computer 10000 registered in the host name field 23271 of the selected file a (F0030).

At this point, the storage management system 23210 sends a notification request for the LBA Range in the logical volume 10010 in the host computer 10000 which stores the actual data of the file a of which the drive name, the directory name, and the file name registered in the items from 23276 to 23278 in the file required response performance list 23270 are specified.

The file management system 12140 in the host computer 10000 receiving the request extracts the LBA Range of the specified file from the LBA Range information table 12141 shown in FIG. 15 (H0000), and notifies the extracted LBA Range to the storage management system 23210 (H0010).

Next, the storage management system 23210 receives the LBA Range of the file a from the file management system 12140 of the host computer 10000 (F0040), and registers the received LBA Range in the LBA Range field 23275 in the file required response performance list 23270 (F0045).

Next, the storage management system 23210, triggered by the host name and the drive name of the file a, identifies values which match the assigned host name field 23226 and the assigned drive name field 23227 in the virtual volume management table 23220 shown in FIG. 8, and acquires the virtual volume ID storing the file a and the pool ID assigning a page to the relevant virtual volume (F0047). For example, if the host name is "HOST1" and the drive name is "E," "V-VOL1" is acquired as the virtual volume ID and "POOL1" is acquired as the pool ID.

Next, in the processing of Loop 2 at steps F0050 to F0110, [the storage management system 23210] extracts a page storing the actual data of the file a, and ascertains the required response performance of the extracted page.

As more specifically described, the storage management system 23210 selects the LBA (b) from the values registered in the LBA Range 23275 in the file required response performance list 23270 (F0050) and, on the condition that the selected LBA (b) is included in the LBA Range field 23238 of the pool management table 23230 shown in FIG. 9, extracts the page ID of which the value in the pool ID field 23231 of the pool management table 23230 shown in FIG. 9 and the pool ID acquired at step F0047 are consistent and, at the same time, of which the value in the virtual volume ID field 23237 of the pool management table 23230 and the virtual volume ID acquired at step F0047 are consistent (F0060). For example, if the LBA (b) is in the range from "01000" to "01999" shown by the Start 23243 and the End 23244 in the LBA Range field 23238, "00001" is extracted as the page ID corresponding to the file a.

Next, the storage management system 23210 determines whether or not the extracted page ID is consistent with the value registered in the page ID field 23281 of the migration candidate page list 23280 shown in FIG. 12 (F0070). The storage management system 23210, if the extracted page ID is not consistent with the value registered in the page ID field 23281 of the migration candidate page list 23280 (in case of "No" at F0070), registers the extracted page ID and the required response performance of the LBA which the page identified by page ID stores in the page ID field and the required response performance field of the migration candidate page list 23280 newly as the required response performance of the page (F0090), and proceeds to step F0110.

Meanwhile, the storage management system 23210, if the extracted page ID is consistent with the value registered in the page ID field 23281 of the migration candidate page list 23280 (in case of "Yes" at F0070), compares the required response performance of the LBA (b) with the required response performance of the page which stores the LBA (b) registered in the migration candidate page list 23280 (F0080). If, at step F0080, the required response performance of the LBA (b) is larger than the required response performance of the relevant registered page, the storage management system 23210 rewrites the required response performance field 23283 of the relevant page of the migration candidate page list 23280 to the required response performance of the LBA (b) (F0100), and proceeds to step F0110.

The storage management system 23210, at step F0110, assumes that the processing of Loop 2 for the LBA (b) selected at step F0050 is completed, selects an LBA which is registered in the file required response performance list 23270 and for which Loop 2 is not performed yet, returns to step F0060 assuming that the selected LBA is the LBA (b), and performs the processing of Loop 2 for all the LBAs registered in the file required response performance list 23270.

Next, the storage management system 23210, if the processing of Loop 2 is completed, selects a file which is registered in the file required response performance list 23270 and for which Loop 1 is not performed yet, returns to step F0020 assuming that the selected file is the file a, and performs the processing of Loop 1 for all the files registered in the file required response performance list 23270.

As more specifically described, the storage management system 23210 extracts a page c (one page among the multiple pages 20041 is simply referred to as the page c) from the migration candidate page list 23280 shown in FIG. 12 (F0130). For example, the storage management system 23210 extracts the page whose page ID is "00003," in accordance with the required response performance of the extracted page c (0.8 G (MB/s)), extracts all the pool volumes (LDEV1, LDEV2, LDEV3) whose values in the response performance field 23257 of the pool volume management table 23250 shown in FIG. 10 are larger (F0140), and registers the extracted pool volumes in the migration destination candidate pool volume field 23285 of the migration candidate page list 23280 (F0150).

Next, the storage management system 23210, assuming that the processing of Loop 3 for the page c is completed and that the page which is registered in the 23280 and for which Loop 3 is not performed yet (e.g. the page with the page ID "00002") is a page c, also returns to F0140, and performs Loop 3 for all the pages in the migration candidate page list 23280. That is, considering that the data of the file a is located across the multiple pages, the storage management system 23210 performs Loop 3 for all the pages belonging to the file a.

Figure 19:
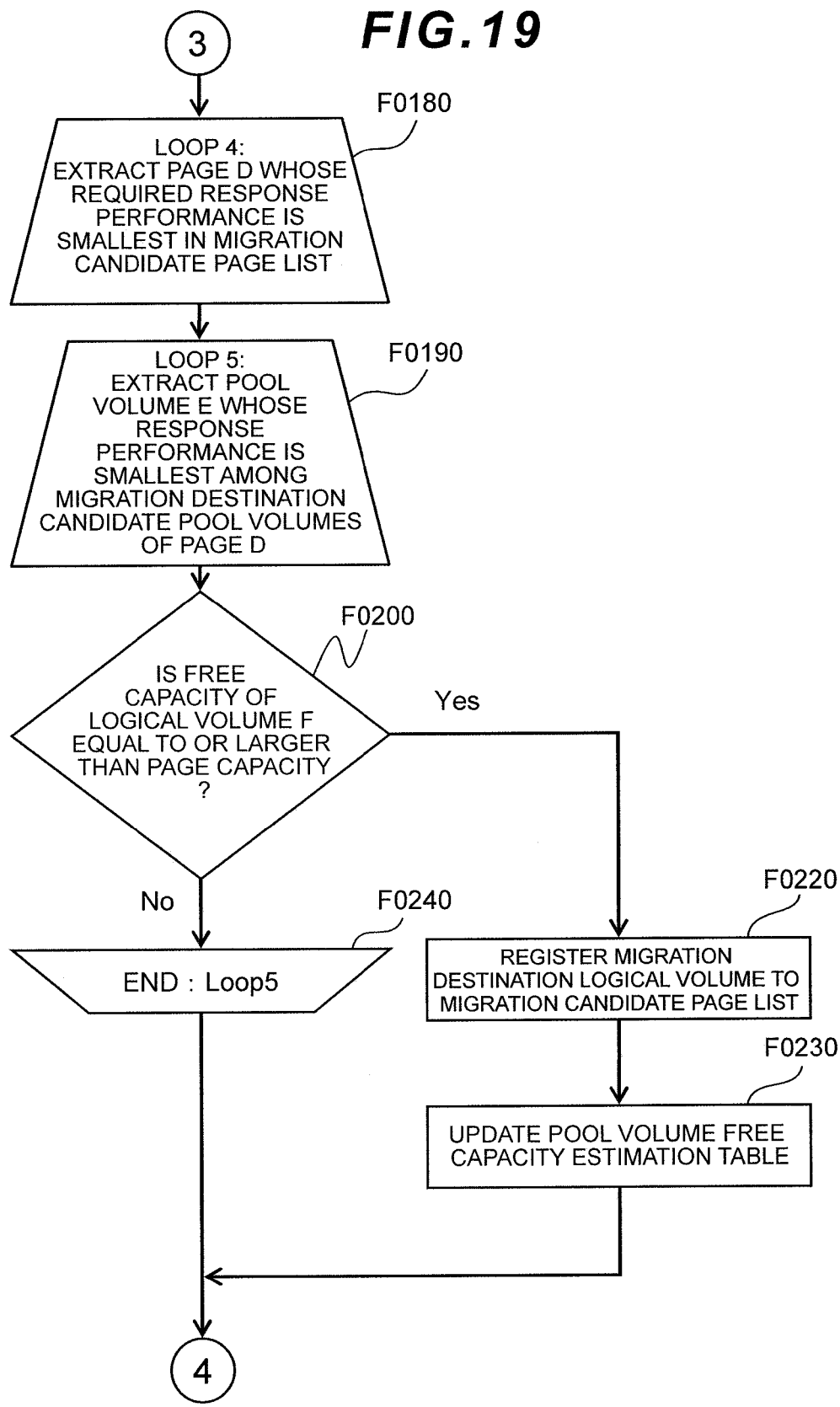
FIG. 19 is a flowchart of creating restrictions on page migration and normal migration in the first embodiment.
Figure 20:
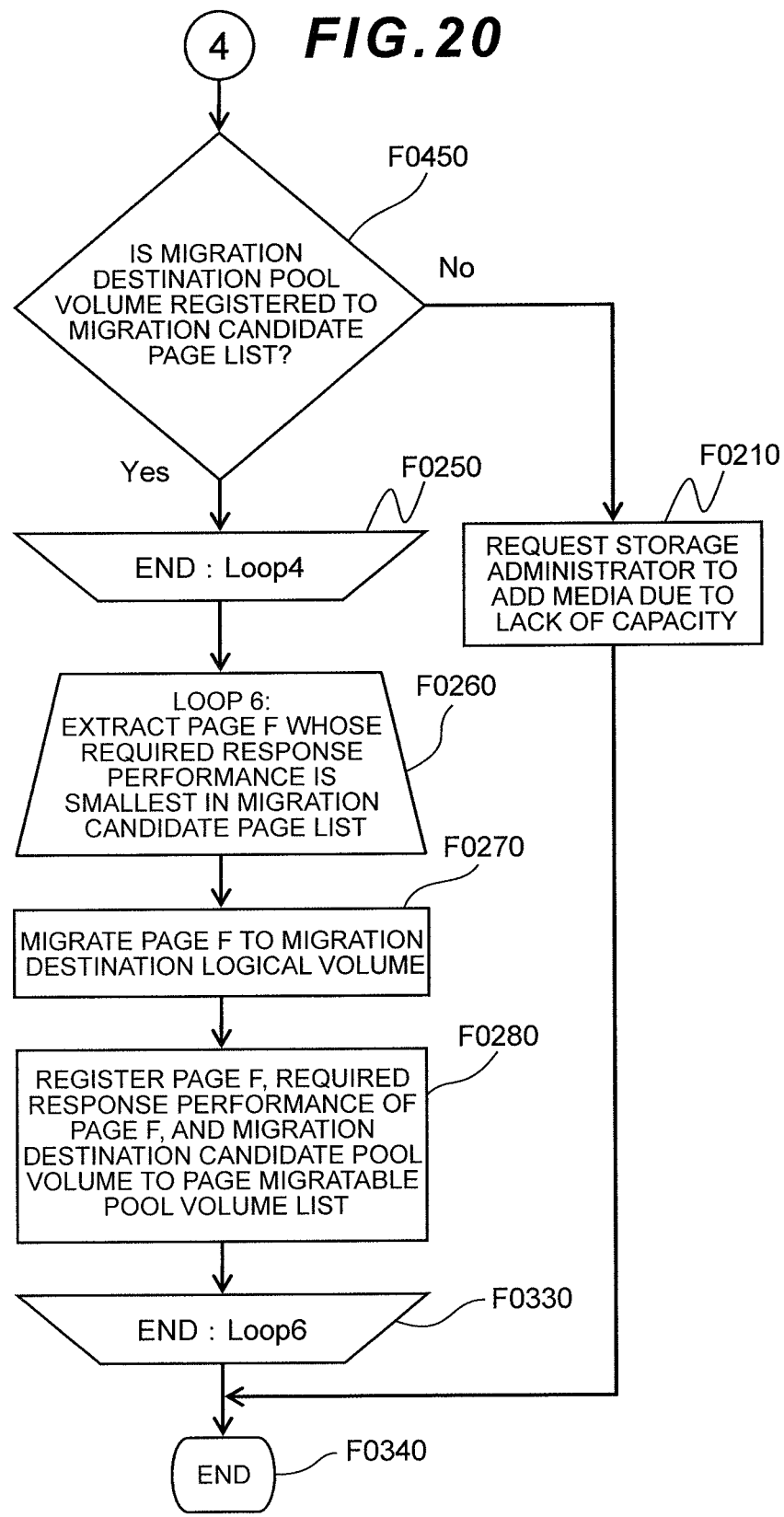
FIG. 20 is a flowchart of creating restrictions on page migration and normal migration in the first embodiment.

Next, through the processing of Loop 4 (from F0180 to F0250) in FIG. 19 and FIG. 20, the storage management system 23210 selects the migration destination pool volumes of the pages registered in the migration candidate page list 23280.

As more specifically described, the storage management system 23210, from the migration candidate page list 23280, extracts the pages (referred to as pages d) sequentially in ascending order of values in the required response performance field 23283 (F0180) and, from the pool volumes registered in the migration destination candidate pool volume field 23285 of the extracted page d, extracts the pool volume e whose response performance is the smallest (that is, whose value of the response performance field 23257 of the pool volume management table 23250 shown in FIG. 10 is the smallest) (one pool volume among the multiple pool volumes 20050, 20060, and 20070 is simply referred to as the pool volume e) (F0190).

Next, the storage management system 23210 refers to the pool volume free capacity estimation table 23290 to check whether the free capacity equal to or larger than the page capacity exists in the pool volume e or not (F0200).

If the free capacity equal to or larger than the page capacity does not exist (in case of "No" at F0200), the storage management system 23210 proceeds to step F0240, selects a pool volume which is registered in the migration destination candidate pool volume field 23285 of the page d, for which Loop 5 is not performed yet and, at the same time, whose response performance is the second smallest next to the pool volume e as a new pool volume e, and returns to step F0200.

Meanwhile, if the free capacity equal to or larger than the page capacity exists in the pool volume e (in case of "Yes" at F0200), the storage management system 23210 registers the pool volume e in the migration destination pool volume field 23287 of the migration candidate page list 23280 (F0220), and next, in the pool volume free capacity estimation table 23290, adds the amount of the page capacity to the value of the free capacity field 23293 of the pool volume in which the page d is stored, subtracts the amount of the page capacity from the value in the free capacity field 23293 of the pool volume e, and completes Loop 5 (F0230).

Next, the storage management system 23210 checks whether the migration destination pool volume is registered in the migration destination pool volume field 23287 of the page d in the migration candidate page list 23280 or not (F0450) and, if the migration destination pool volume of the page d is not registered (in case of "No" at F0450), the storage management system 23210 notifies the storage administrator to add media to any of the pool volumes registered in the migration destination candidate pool volume field 23285 (F0210), and completes the entire processing (F0340).

If the migration destination pool volume of the page d is registered (in case of "Yes" at F0450), the storage management system 23210 proceeds to step F0250, assumes that the processing of Loop 4 for the page d is completed at step F0250, returns to F0190 with the page whose value in the required response performance field 23283 is the second smallest next to the page d in the migration candidate page list 23280 as a new page d, and performs Loop 4 for all the pages registered in the migration candidate page list 23280.

Next, through the processing of Loop 6 (from F0260 to F0330), [the storage management system 23210] migrates the pages registered in the migration candidate page list 23280 to the pool volume selected in Loop 4.

As more specifically described, the storage management system 23210 selects a page f with the smallest value of the values registered in the required response performance field 23283 in the migration candidate page list 23280 (F0260), and migrates the page f to the pool volume registered in the migration destination pool volume field 23287 of the selected page f (F0270).

Next, the storage management system 23210 registers the ID of the page f in the page ID field 23281 of the page migratable pool volume list 23240 shown in FIG. 14, and furthermore registers the value in the migration destination pool volume field of the page f in the migratable pool volume field 23245 (F0280). The storage management system 23210, at step F0330, assumes that the processing of Loop 6 for the page f is completed, returns to F0270 with the page whose value in the required response performance field 23283 is the second smallest next to the page f as a new page f, performs Loop 6 for all the pages registered in the migration candidate page list 23280, and completes the processing of this embodiment (F0340).

Subsequently, the storage management system 23210, if a pool volume is newly added to the pool 20040, compares the response performance of the added pool volume with the required response performance of each page registered in the required response performance field 23243 of the page migratable pool volume list 23240 and, if [the added pool volume] satisfies the required response performance of the relevant page, registers the added pool volume in the migratable pool volume field 23245.

Figure 21:
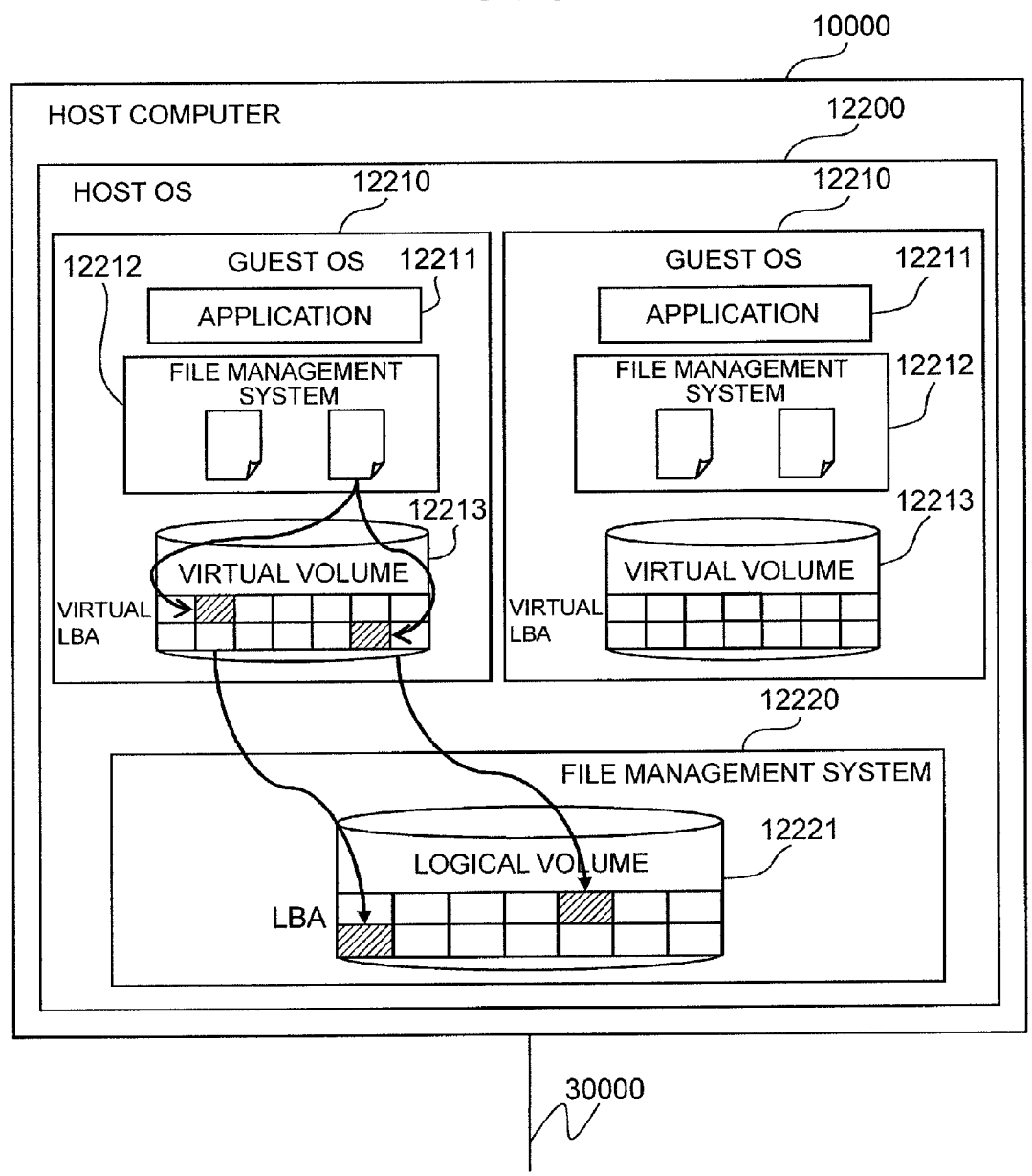
FIG. 21 is a conceptual diagram of a virtualized host computer in the first embodiment.

Furthermore, in the first embodiment, as shown in FIG. 21, even if the host computer 10000 is virtualized, if the correspondence of the LBA (hereinafter referred to as a VM LBA Range) indicating where the actual data of the file is stored in the virtual volume 12213 assigned to the guest OS 12110 by the host OS 12200 with the LBA indicating where the data is stored in the logical volume 12221 assigned to the host OS 12200 by the storage management system 23210 is made, the processing can be performed from the flowchart F0050 of this embodiment.

Figure 22:
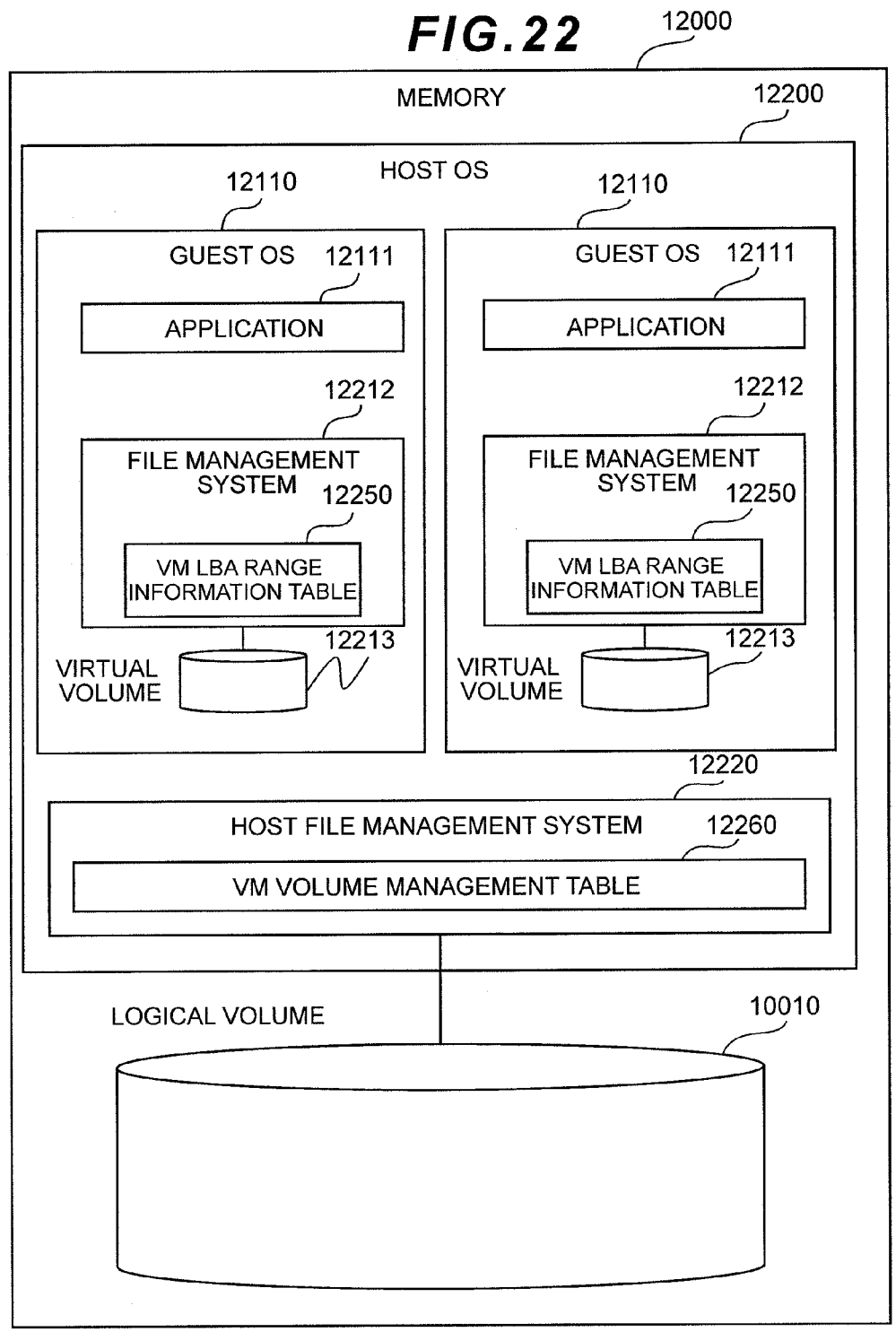
FIG. 22 is a logical configuration diagram of a memory of the virtualized host computer in the first embodiment.

FIG. 22 shows an example of the logical configuration in a memory in cases where the host computer 10000 is virtualized. The host OS 12200 is stored in the memory 12000 and, in the host OS 12200, the guest OS 12110 and the host file management system 12220 operate. The host file management system 12220 in the guest OS 12110, by using the logical volume 12221 provided by the storage apparatus 20000, provides the virtual volume 12213 to the guest OS 12110. The file management system 12212 of the guest OS 12110 stores the file which the application 12111 uses in the virtual volume 12213 provided by the host OS 12200.

Furthermore, the file management system 12140 comprises the VM LBA Range information table 12250 which manages the LBA storing the above-mentioned file, and the host file management system 12220 comprises the VM volume management table 12260 which manages the virtual volumes 12213 provided to the guest OS 12110. The details of the VM LBA Range information table 12250 and the VM volume management table 12260 are described later.

FIG. 23 shows an example of the input information 59000 which is input by the user's operation or the input information 59000 which is sent from the file management system 14150 in the host computer 10000 to the storage management system 23210 in the storage apparatus 20000. In this case, the storage management system 23210, in addition to the input information 50000 in FIG. 7, receives a VM name which is the ID for uniquely identifying the virtual machine in the host computer 10000 from the host computer 10000.

FIG. 24 shows a configuration example of the VM file required response performance list 23279 which the storage management system 23210 generates. The file required response performance list 23279, in addition to the file required response performance list 23270 shown in FIG. 11, includes a VM name field 23272 to be the ID for uniquely identifying the virtual machine in the host computer 10000.

The storage management system 23210, receiving the input information 59000 by the user's operation or the input information 59000 sent from the file management system 12140 in the host computer 10000, registers the received input information 59000 in the host name field 23271, the VM name field 23272, the drive name field 23276, the directory name field 23277, the file name field 23278, and the required response performance field 23273 of the VM file required response performance list 23279. Furthermore, the storage management system 23210, receiving the LBA Range in which the file used by the guest OS 12110 is stored from the host file management system 12220 in the guest OS 12110, registers the information to the LBA Range field 23275 in the VM file required response performance list 23279.

FIG. 25 shows a configuration example of the VM LBA Range information table 12250 which a guest OS 12110 in the host computer 10000 comprises. The VM LBA Range information table 12250 includes a VM name field 12252 to be the information for uniquely identifying a file, a drive name field 12253, a directory name field 12254, a file name field 12255, and a VM LBA Range field 12256 indicating the range in which the relevant file is stored.

The file management system 12212, when writing the data to the virtual volume 12213, registers the VM name field 12252, the drive name field 12253, the directory name field 12254, and the file name field 12255 in the VM LBA Range information table 12250 as the information for uniquely identifying the written file, and registers the LBA of the logical volume 12213 in which the relevant file is stored in the LBA Range field.

FIG. 26 shows a configuration example of the VM volume management table 12260 which the host OS in the host computer 10000 comprises. The VM volume management table 12260 comprises a virtual volume name field 12261 to be the ID by which a virtual volume 12213 can be uniquely identified in the host OS, an assigned virtual machine name field 12263 to be the ID by which a virtual machine to which the virtual volume 12213 is assigned can be uniquely identified, an assigned VM drive name field 12264 to be the drive name assigned to the virtual volume 12213, a VM LBA Range field 12265 indicating the area where the data is stored in the virtual volume 12213, and an LBA Range field 12266 indicating the range of the LBA of the logical volume 12221 corresponding to the LBA registered in the VM LBA Range field 12265.

The host file management system 12220, if a virtual volume is created by the administrator of the host computer 10000, registers the virtual volume name in the virtual volume name field 12261 of the VM volume management table 12260. If the virtual volume is assigned to the guest OS by the administrator, the host file management system 12220 registers the virtual machine name 12263 and the assigned VM drive name 12264 in the VM volume management table 12260 and, if data is written to the virtual volume 12213 by the file management system 12212 of the guest OS 12110, registers the VM LBA Range indicating the area in the virtual volume 12213 where the data is written and the LBA Range indicating the area of the corresponding logical volume 12221 in the VM volume management table 12260.

Figure 27:
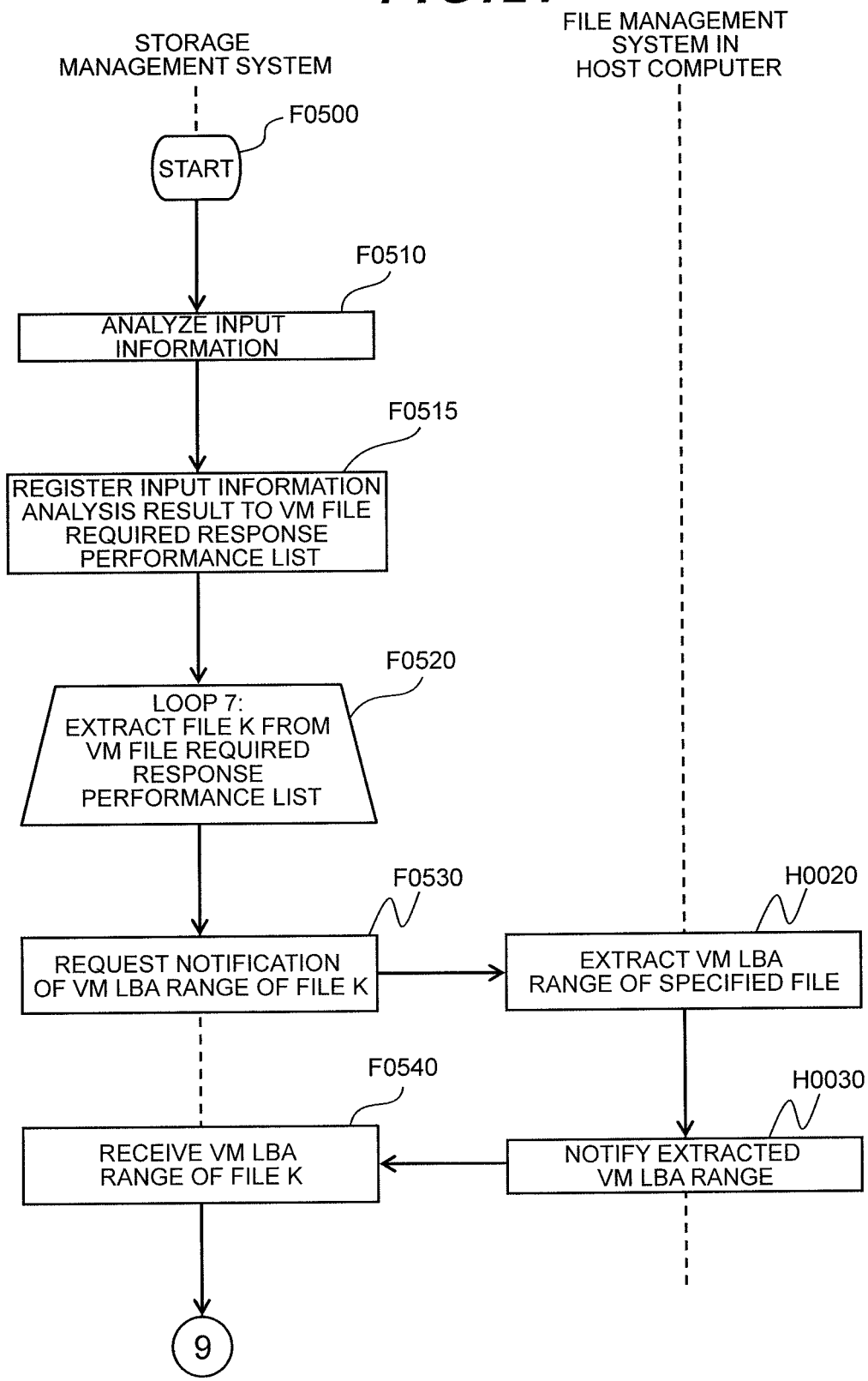
FIG. 27 is a flowchart of the method for associating the LBA of the logical volume of the guest OS of the host computer and the LBA of the logical volume of the host OS in the first embodiment.
Figure 28:
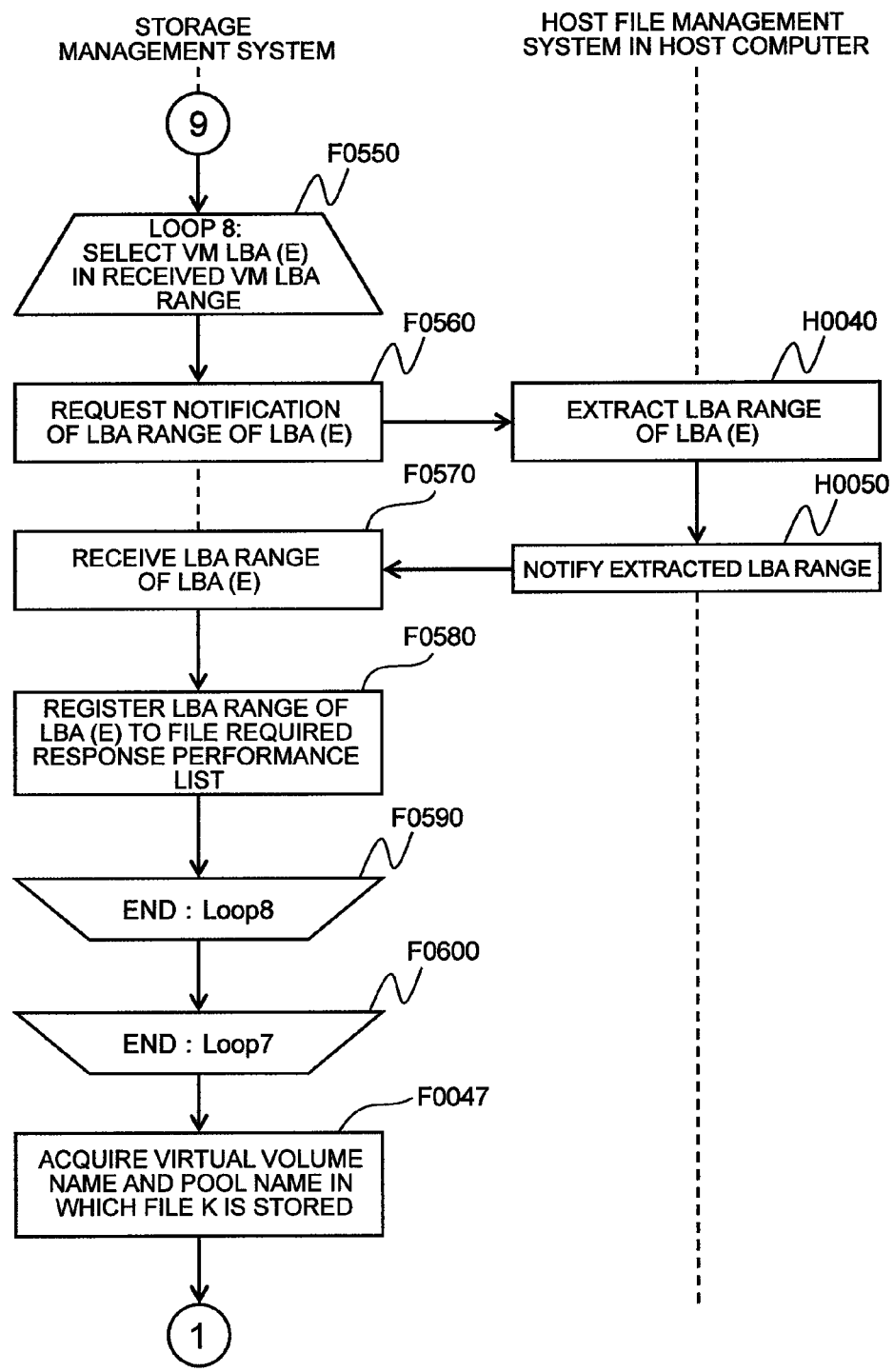
FIG. 28 is a flowchart of the method for associating the LBA of the logical volume of the guest OS of the host computer and the LBA of the logical volume of the host OS in the first embodiment.

FIG. 27 and FIG. 28 show the flowcharts of the method for associating the LBA indicating where the actual data of the file is stored in the logical volume 12213 which the host OS 12200 assigned to the guest OS 12110 and the LBA indicating where the data is stored in the logical volume 12221 which the storage management system 23210 assigned to the host OS 12200.

Firstly, the storage management system 23210, receiving the input information 50000 from the host computer 10000, starts the processing (F0500). Next, the storage management system 23210 analyzes the input information 50000 (F0510), and registers the host name, the VM name, the drive name, the directory name, the file name, and the required response performance in the VM file required response performance list 23279 (F0515).

Next, through the processing of Loop 7 (from F0520 to F0600), the storage management system 23210, for the file registered in the VM file required response performance list, in accordance with the LBA of the virtual volume 12213 assigned to the guest OS in which the relevant file is stored, performs the conversion into the LBA of the logical volume 12221 assigned to the host OS 12200 by the storage management system 23210, and determines the required response performance of each LBA.

As more specifically described, the storage management system 23210 extracts a file k from the VM file required response performance list 23270 (F0520), and sends a notification request of the VM LBA Range in which the file k is stored to the file management system 12212 of the guest OS 12110 in the host computer 10000 (F0530).

The file management system 12212 in the host computer 10000, receiving the VM LBA Range notification request from the storage management system 23210, extracts the VM LBA Range with the consistent drive name, directory name, and file name from the VM LBA Range information table 12250 shown in FIG. 25 (H0020), and notifies the extracted VM LBA Range to the storage management system 23210 (H0030).

The storage management system 23210 receives the VM LBA Range from the file management system 12212 of the guest OS 12110 in the host computer 10000 (F0540).

Next, in the processing of Loop 8 from F0550 to F0590, the storage management system 23210 acquires the LBA Range corresponding to the VM LBA Range from the file management system 12212 of the guest OS 12110 in the host computer 10000 from the host file management system 12220 in the host OS 12200.

As more specifically described, the storage management system 23210 extracts the VM LBA (e) from the received VM LBA Range (F0550), and requires an LBA Range notification of the host file management system 12220 (F0560).

The host file management system 12220, receiving the LBA Range notification request from the storage management system 23210, extracts the LBA Range corresponding to the VM LBA Range whose assigned virtual machine name and assigned VM drive name to which the VM LBA (e) is assigned from the VM volume management table 12260 (H0040), and notifies the extracted LBA Range to the storage management system 23210 (H0050).

Next, the storage management system 23210, receiving the LBA Range from the host file management system 12220, registers the received LBA Range in the VM file required response performance list 23279 (F0580), assumes an unprocessed VM LBA (e+1) to be the VM LBA (e), and performs steps F0550 to F0590.

The storage management system 23210, after performing steps F0550 to F0590 for the received VM LBA Range, completes Loop 8, after performing steps F0520 to F0600 for all the files registered in the VM file required response performance list 23279, also completes Loop 7, and proceeds to step F0047. Hereinafter, as the processing is the same as described above, the description is omitted.

In this embodiment, if the host computer 10000 is a mainframe, the same procedure can be applied by replacing the file by a dataset and replacing the directory by a catalog.

According to this embodiment, if an access request whose access target is a file is received from the access request source and if the required response performance of the file is added to the received access request, it is possible to compare the required response performance of the file with the response time of the pool volume assigned to the page 20041 (first pool volume), if the response time of the compared pool volume does not satisfy the required response time, select a pool volume whose response time satisfies the required response time from the pool volumes, assume the selected pool volume, for example, the pool volume 20070 to be the new pool volume (second pool volume), assign the new pool volume 20070 to the page 20041, and migrate the page 20041 assigned to the pool volume 20050 to the pool volume 20070, and it is possible to store the actual data of the file to the page 20041 assigned to the pool volume 20070.

Furthermore, according to this embodiment, the required response performance of the file (required response time: 7 GB/s) is compared with the response time of the storage device (1 GB/s) corresponding to the pool volume 20050 assigned to the page 20041, if the response time of the compared storage device does not satisfy the required response time, the page divided from the pool volume 20050 is migrated to the page divided from the pool volume 20070 whose response time corresponds to the storage device satisfying the required response time (response performance: 8 GB/s), and the storage destination of the actual data of the file is supposed to be changed from the pool volume 20050 to the pool volume 20070, by which method, the actual data of the file can be stored in the SSD 27010 as needed.

Furthermore, according to this embodiment, by causing the required response performance related to the actual data stored in the page 20041 to be the standard for page migration as well as the actual measured number of I/Os of the page 20041, the page 20041 which stores the actual data of the file 12121 to which the required response performance is provided can be constantly located in the pool volume 20070 which satisfies the required response performance, which can prevent the processing delay and termination of the application 12110 due to the delay in response from the storage apparatus 20000.

Second Embodiment

Figure 29:
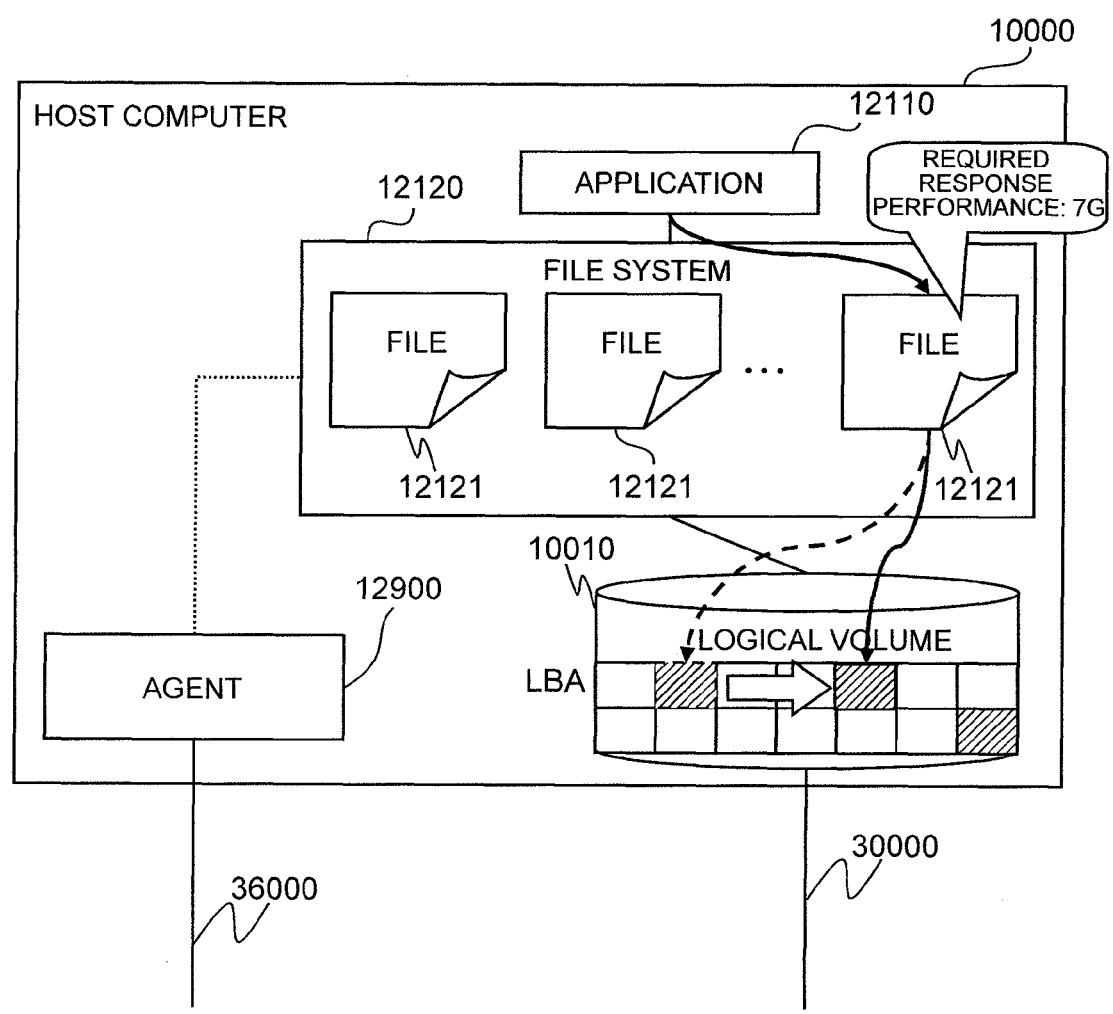
FIG. 29 is a conceptual diagram of a host computer where the agent is resident in the second embodiment.

In the second embodiment, after performing the flow in the first embodiment for at least once, as shown in FIG. 29, the agent 12900 in the host computer 10000 monitors the file management system 12140 in the host computer 10000 and, if detecting the change of the storage LBA of the file 12121 which the application 12110 uses, the agent 12900 instructs the storage management system 23210 for the re-performance from the flowchart F0020 in the first embodiment. The details of the method in which the storage management system 23210 extracts the page 20041 for storing the actual data of the file 12121 to which the required response performance is provided, identifies the pool volume satisfying the required response performance of the extracted page 20041 (e.g. one pool volume among the pool volumes 20050, 20060, and 20070), and migrates the data of the extracted page 20041 to the pool volume satisfying the required response performance e.g. the pool volume 20070, which inhibits the data of the extracted page 20041 from being migrated to the pool volume not satisfying the required response performance of the extracted page 20041; e.g. the pool volume 20060 are described.

Figure 30:
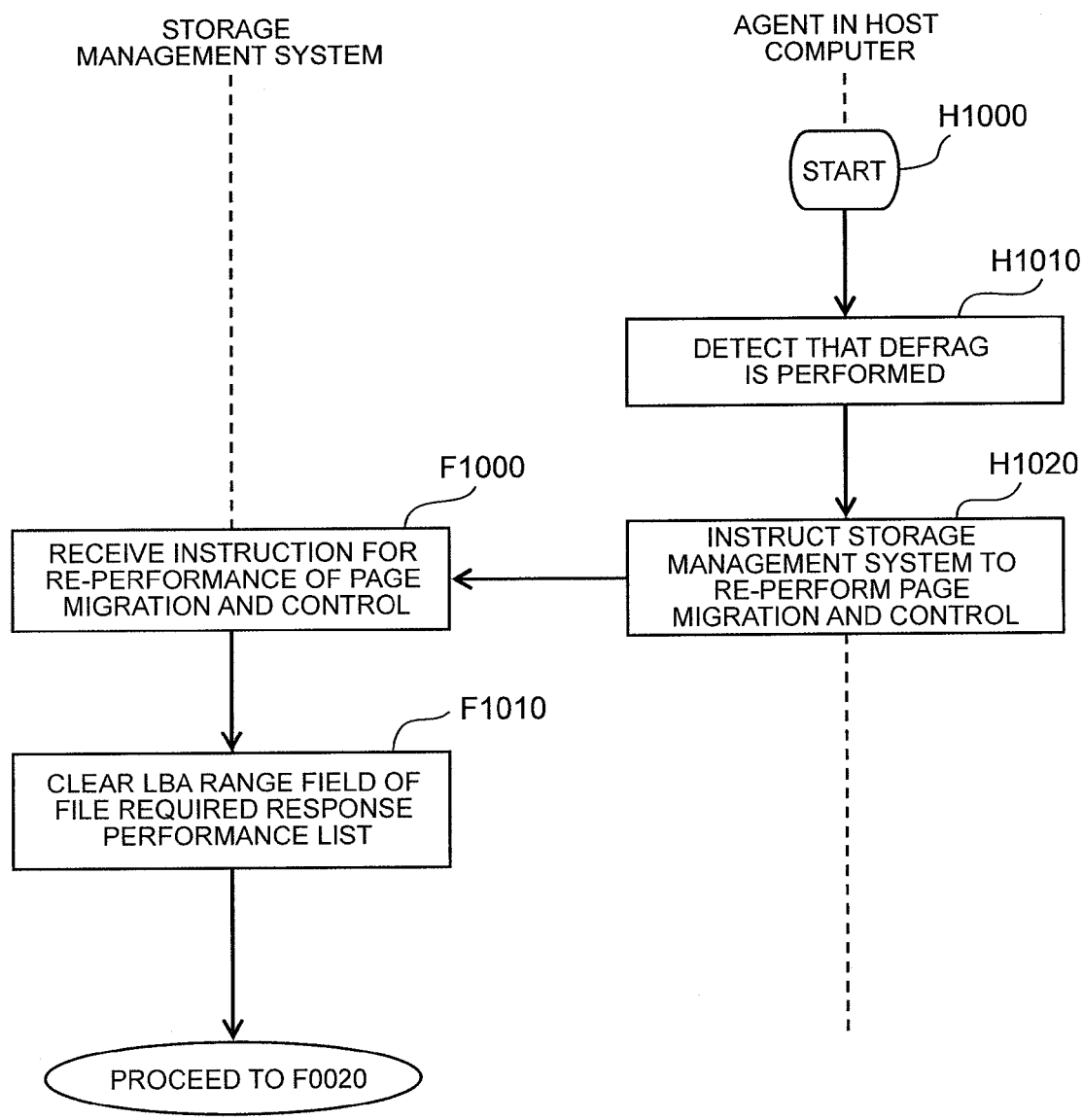
FIG. 30 is a flowchart in which the agent resident in the host computer in the second embodiment notifies the storage management system that the LBA of the file was changed and at the end of which the storage management system starts the processing.

FIG. 30 shows a flowchart of the method by which the administrator of the host computer 10000 performs defragmentation (defrag) for the logical volume 10010 assigned to the host, the agent 12900 detects that the LBA Range field 12125 in the LBA Range information table 12141 is updated by the file management system 12140, the agent 12900 instructs the storage management system 23210 for the re-performance from the flowchart F0020 in the first embodiment, and the storage management system 23210 deletes the value in the LBA Range field of the file required response performance list 23270.

Firstly, the administrator of the host computer 10000 performs the defrag (the processing for changing the contents in the LBA Range field 12125) for the logical volume 10010 provided to the host computer 10000 and, if the LBA Range field 12125 of the LBA Range information table 12141 is updated by the file management system 12140, the flow is started (H1000).

Next, the agent 12900, detecting that the LBA Range field 12125 of the LBA Range information table 12141 is updated (H1020), notifies that the LBA Range field 12125 in the LBA Range information table 12141 is updated to the storage management system 23210, and instructs the re-performance from the flowchart F0020 in the first embodiment (H1020).

Figure 16:
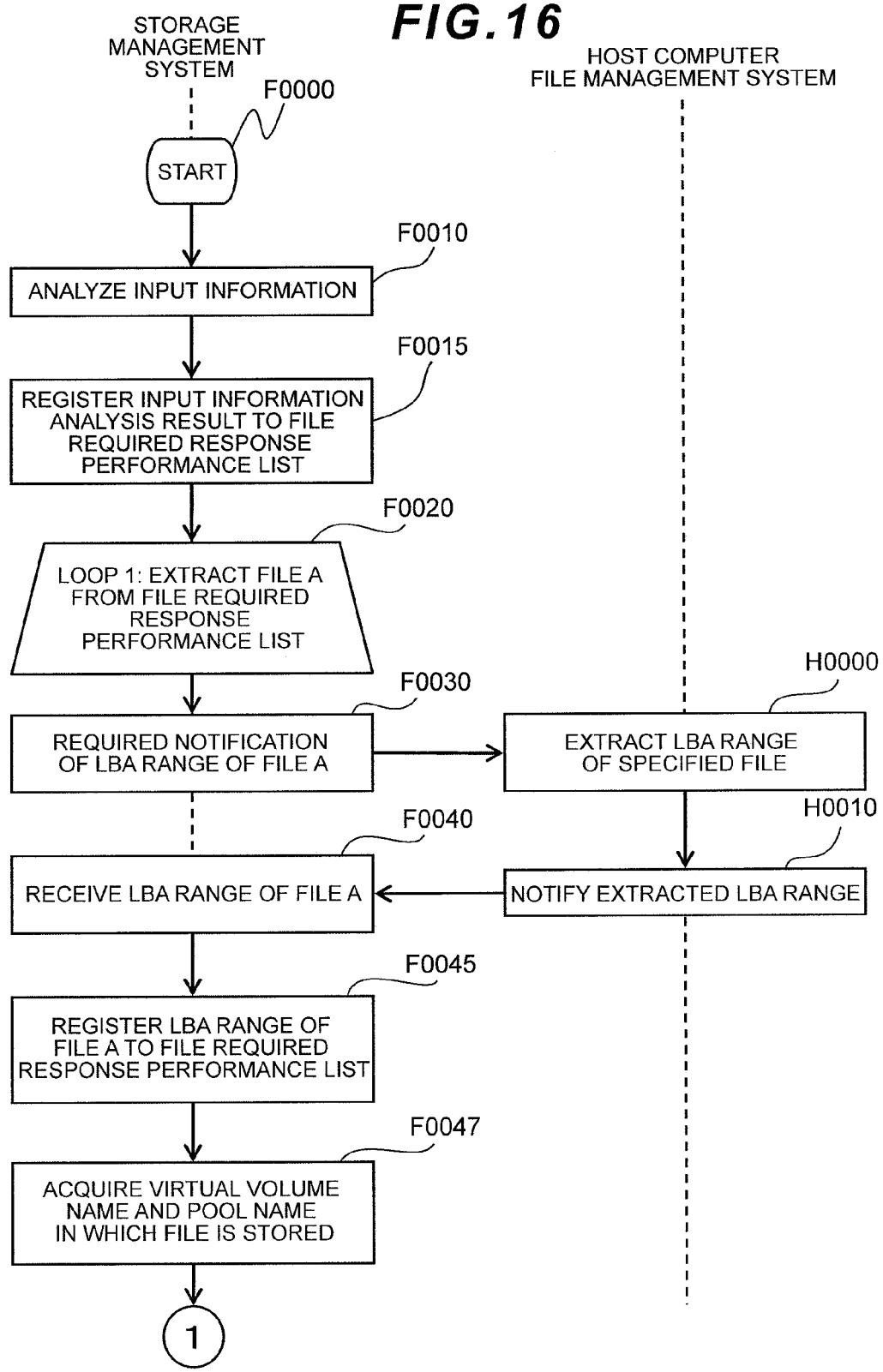
FIG. 16 is a flowchart of creating restrictions on page migration and normal migration in the first embodiment.
Figure 17:
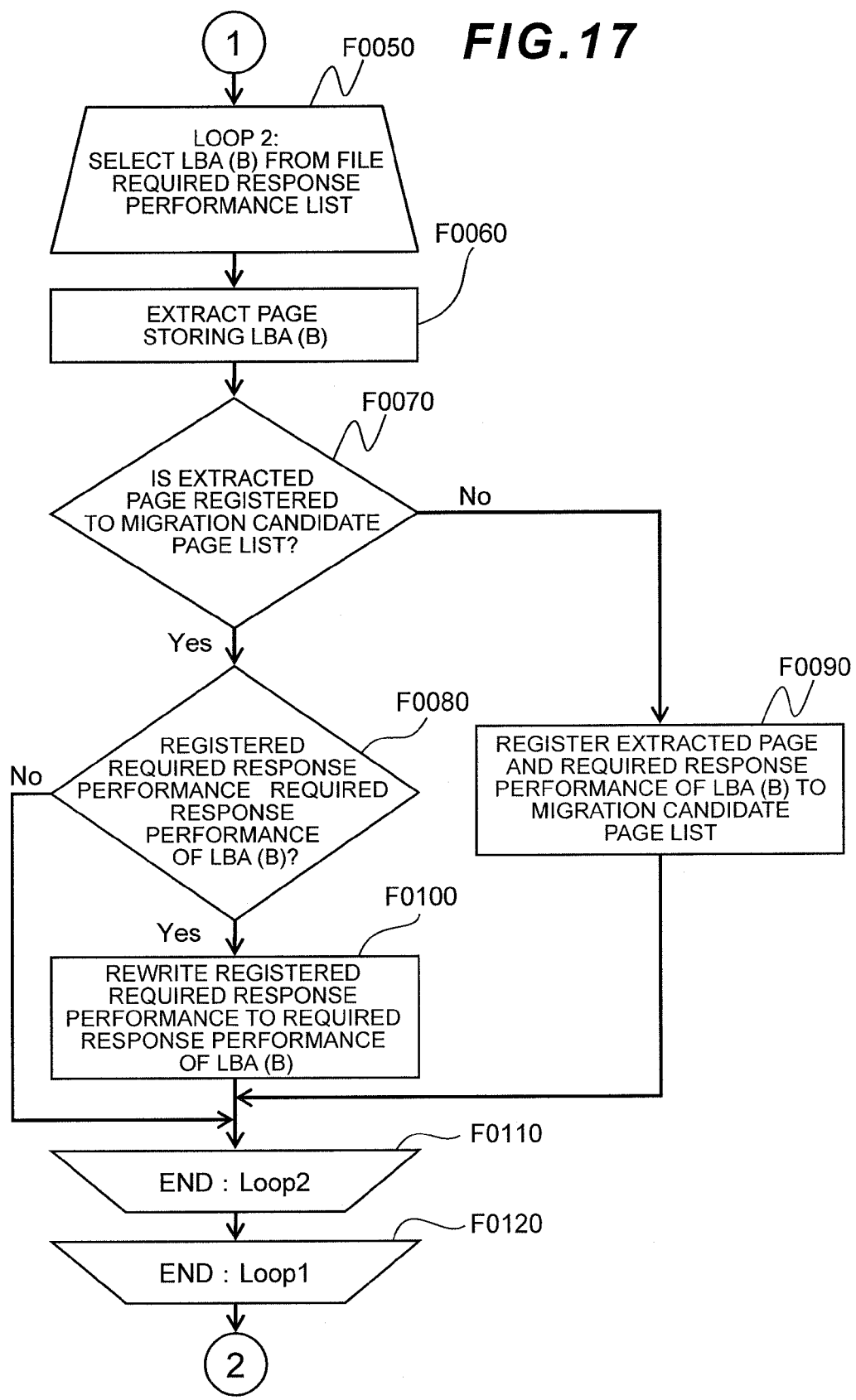
FIG. 17 is a flowchart of creating restrictions on page migration and normal migration in the first embodiment.

The storage management system 23210 receives the instruction for re-performance from the flowchart F0020 in the first embodiment (F1000), deletes the value in the LBA Range field 23275 of the file required response performance list 23270 shown in FIG. 11 (F1010), and proceeds to step F0020 shown in FIG. 16.

That is, the storage management system 23210, along with the update of the LBA Range field 12125 of the LBA Range information table 12141, resends the LBA Range notification request related to all the files to the host computer 10000 and, if receiving the updated LBA Range from the host computer 10000, registers the value of the received LBA Range in the LBA Range field 23275 of the file required response performance list 23270. As the following processing is the same as the first embodiment, the description is omitted.

Furthermore, in the second embodiment, the administrator of the host computer 10000, for the logical volume 10010 assigned to the host computer 10000, can perform the defrag for clearing the free area of the LBA Range and generate the LBA correspondence table 12910 indicating the correspondence of the LBAs before and after updating the LBA Range field 12125 of the LBA Range information table 12141 which the file management system comprises. In this case, by sending the created LBA correspondence table from the host computer 10000 to the storage management system 23210, it is also possible for the storage management system 23210 to re-perform the processing from step F0130 of the flowchart in the first embodiment.

Figure 31:
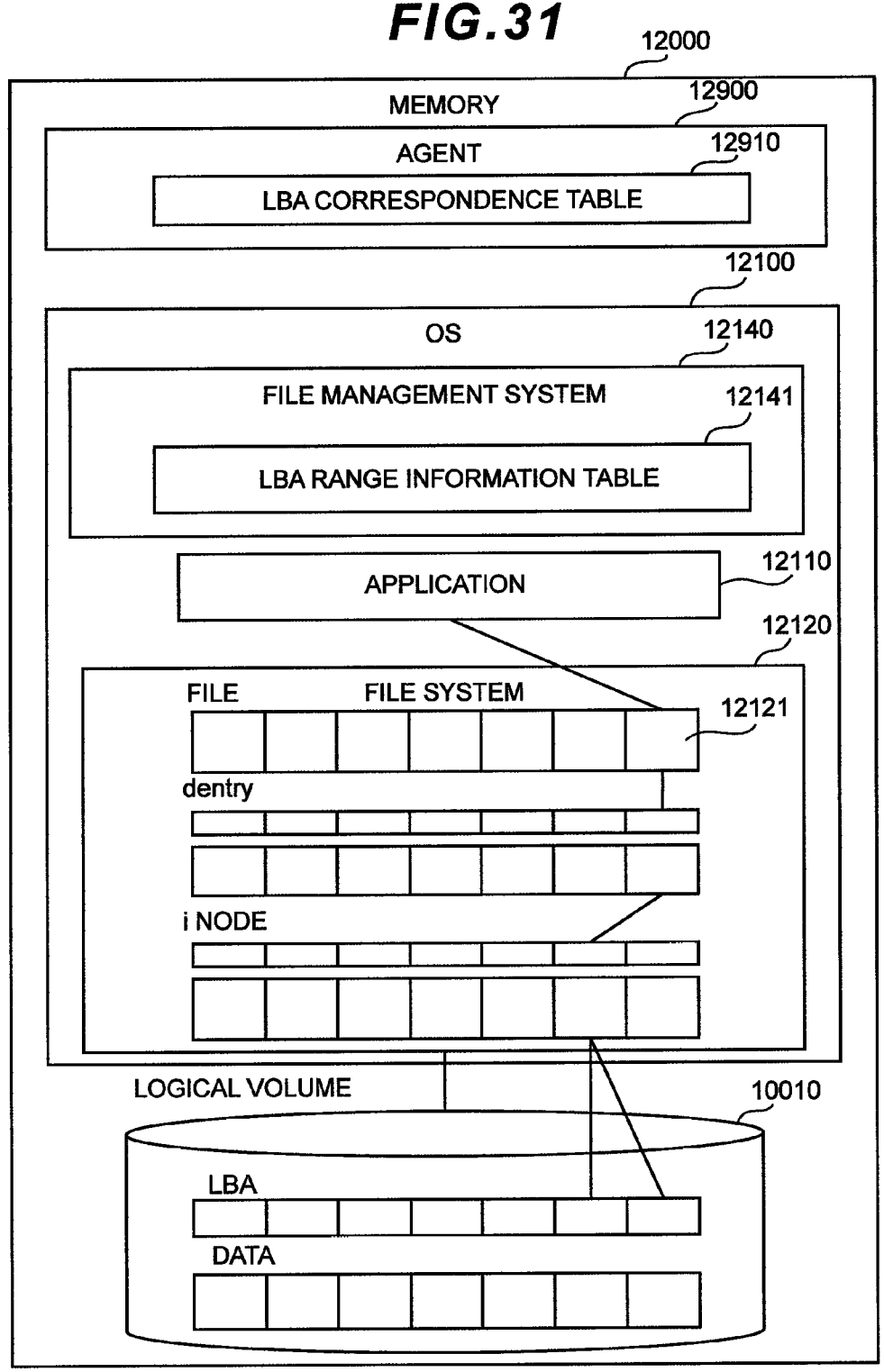
FIG. 31 is a logical configuration diagram of a memory of the host computer when the agent in the second embodiment creates an LBA correspondence table.

FIG. 31 shows a logical configuration example of the memory 12000 in the host computer 10000. As in the first embodiment, in the memory 12000, the OS 12100, the agent 12900, and others are stored. In the OS 12100, the file management system 12140, the application 12110, and the file system 12120 operate. The file management system 12140 of the OS 12100, by using the logical volume 10010 provided from the storage apparatus 20000, stores the file 12121 which the application 12110 uses.

Furthermore, the file management system 12140 comprises the LBA Range information table 12141 for managing the LBA storing the file 12121 which the application 12110 uses. Furthermore, the agent 12900 which the memory 12000 comprises monitors the file management system 12140 in the OS 12100 and, if detecting the change of the LBA Range information table 12141, generates the LBA correspondence table 12910. In the LBA Range information table 12141, if the defrag is performed by the administrator of the host computer 10000, the LBA Range field 12125 is updated. The details of the LBA correspondence table 12910 are described later in FIG. 32.

Figure 32:
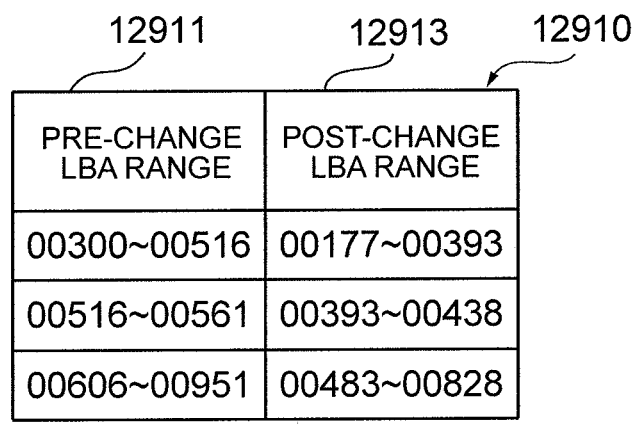
FIG. 32 is a configuration diagram of the LBA correspondence table created by the agent in the second embodiment.

FIG. 32 shows a configuration example of the LBA correspondence table 12910 which the agent 12900 generates. The LBA correspondence table 12910 includes a pre-change LBA Range field 12911 and a post-change LBA Range field 12913.

If the agent 12900 detects that the defrag is performed for the logical volume 10010 by the administrator of the host computer 10000 and that the LBA Range field 12125 of the LBA Range information table 12141 is updated by the file management system 12140, the agent 12900 registers the LBA where the migrated data was stored in the pre-change LBA Range field in the LBA correspondence table 12910 and registers the LBA of the migration destination of the data stored in the relevant LBA in the post-change LBA Range field in the LBA correspondence table 12910.

Figure 33:
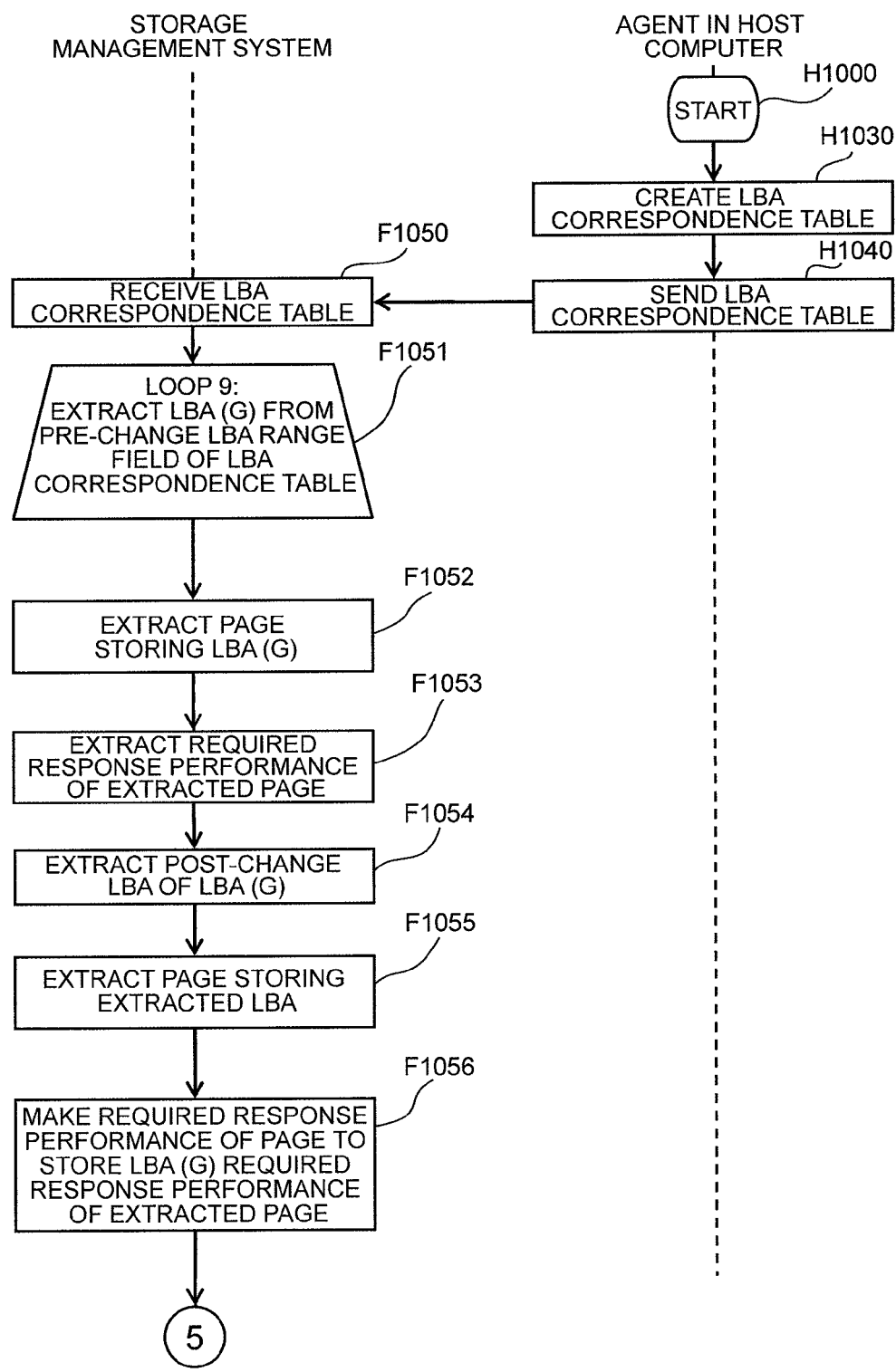
FIG. 33 is a flowchart in which the storage management system in the second embodiment, in accordance with the LBA correspondence table received from the agent, extracts the required response performance of each page.
Figure 34:
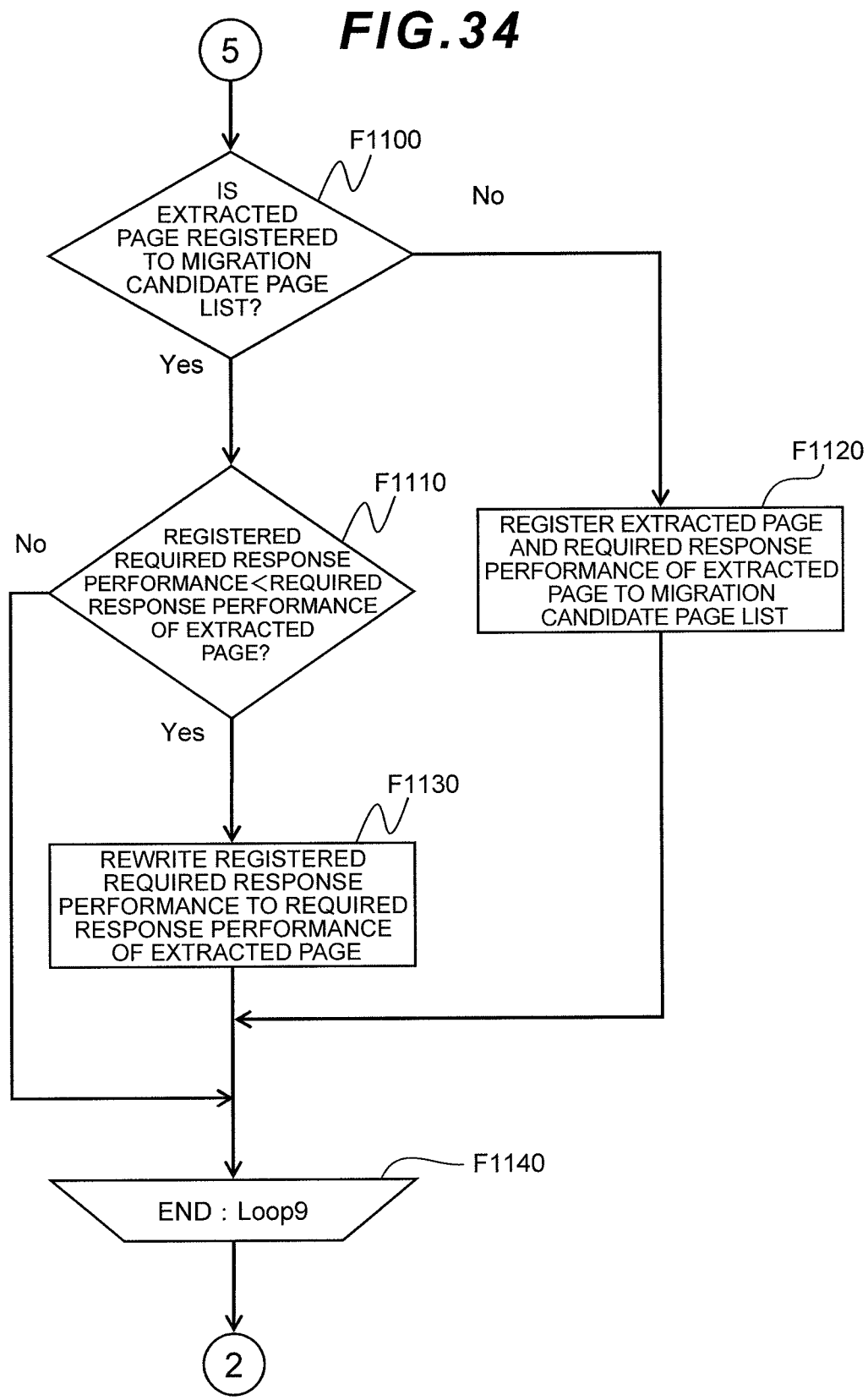
FIG. 34 is a flowchart in which the storage management system in the second embodiment, in accordance with the LBA correspondence table received from the agent, extracts the required response performance of each page.

FIG. 33 and FIG. 34 show the flowcharts of the method by which, by the agent detecting that the storage area of the data stored in the logical volume is changed and notifying the correspondence of the created pre-change and post-change LBA Ranges to the storage management system 23210, the storage management system 23210, in accordance with the sent correspondence of the LBA Ranges, updates the required response performance of each page.

Firstly, the administrator of the host computer 10000, for the logical volume 10010 provided to the host computer 10000, performs the defrag and, triggered by the agent 12900 detecting that the LBA Range field 12125 of the LBA Range information table 12141 is updated by the file management system 12140, the processing is started (H1000).

Next, the agent 12900 acquires the pre-change and post-change values of the LBA Range field 12125 of the LBA Range information table 12141 changed by the file management system 12140 in the host computer 10000, registers the acquired pre-change and post-change values of the LBA Range field 12125 in the LBA correspondence table 12910 (H1030), and sends LBA correspondence table 12910 in which the pre-change and post-change values of the LBA Range field 12125 are registered to the storage management system 23210 (H1040).

The storage management system 23210, receiving the LBA correspondence table 12910 in which the pre-change and post-change values of the LBA Range field 12125 are newly registered (F1050), next, in Loop 9 (from F1051 to F1140), updates the migration candidate page list 23280 in accordance with the received LBA correspondence table 12910.

As more specifically described, the storage management system 23210 extracts an LBA (g) from the pre-change LBA Range field 12911 of the received LBA correspondence table 12910 (F1051), and the extracted LBA (g) extracts the page ID included in the range of the values in the Start field 23243 and the End field 23244 of the LBA Range field 23238 of the pool management table 23230 shown in FIG. 9 (F1052).

Next, the storage management system 23210 extracts the response performance whose extracted page ID is consistent with the value in the page ID field 23241 of the page migratable pool volume list 23240 shown in FIG. 14 (F1053).

Next, the storage management system 23210 extracts the post-change LBA of the LBA (g) from the LBA correspondence table 12910 (F1054), extracts the page ID where the extracted LBA is included in the range of the values in the Start field 23243 and the End field 23244 of the LBA Range field 23238 of the pool management table 23230 (F1055), and assumes the required response performance of the page storing the LBA (g) to be the required response performance of the page in which the post-change LBA of the LBA (g) is stored (F1056).

Next, the storage management system 23210 checks whether the page ID of the page in which the post-change LBA of the LBA (g) is stored is consistent with the value registered in the page ID field 23281 of the migration candidate page list 23280 or not (F1100). If the page ID of the page in which the post-change LBA of the LBA (g) is stored is not consistent with the value registered in the page ID field 23281 of the migration candidate page list 23280 (in case of "No" at F1100), the storage management system 23210 registers the page ID of the page in which the post-change LBA of the LBA (g) is stored and the required response performance of the page in which the post-change LBA of the LBA (g) is stored in the page ID field 23281 and the required response performance field 23283 of the migration candidate page list 23280 (F1120).

Meanwhile, if the page ID of the page in which the post-change LBA of the LBA (g) is stored is consistent with the value registered in the page ID field 23281 of the migration candidate page list 23280 (in case of "Yes" at F1110), the storage management system 23210 compares the required response performance of the page in which the post-change LBA of the LBA (g) is stored with the required response performance registered in the migration candidate page list 23280 (F1110).

If the required response performance of the page in which the post-change LBA of the LBA (g) is stored is larger than the required response performance of the relevant registered page (in case of "Yes" at F1110), the storage management system 23210 rewrites the required response performance field 23283 of the relevant page of the migration candidate page list 23280 to the required response performance of the page in which the post-change LBA of the LBA (g) is stored (F1130), and proceeds to step F1140.

Meanwhile, if the required response performance of the page in which the post-change LBA of the LBA (g) is stored is equal to or smaller than the registered required response performance (in case of "No" at F1110), the storage management system 23210 proceeds to step F1140 and, at step F1140, assumes that the processing of Loop 9 for the LBA (g) is completed, selects an LBA which is registered in the LBA correspondence table 12910 and for which Loop 9 is not performed yet, returns to F1051 assuming the same to be the LBA (g), performs the processing of Loop 9 for all the files registered in the LBA correspondence table 12910, and proceeds to F0130. As the following processing is the same as the first embodiment, the description is omitted.

According to this embodiment, if the agent 12900 in the host computer 10000 detects the change of the LBA storing the file 12121, by the storage management system 23210 re-performing the processing from step F0020 to step F0340 in the first embodiment, even if the LBA storing the file 12121 is changed, the data of the page to which the required response performance is provided can be migrated to the pool volume (second pool volume) satisfying the required response performance, which can inhibit the data of the page to which the required response performance is provided from being migrated to the pool volume (first pool volume) not satisfying the required response performance.

Furthermore, according to this embodiment, if the agent 12900 in the host computer 10000 detects the change of the LBA storing the file 12121, by sending the information of the LBA correspondence table 12910 from the agent 12900 to the storage management system 23210, the storage management system 23210 re-performs the processing from step F0130 to step F0340 in the first embodiment, and therefore, even if the LBA storing the file 12121 is changed, can migrate the data of the page to which the required response performance is provided to the pool volume satisfying the required response performance (second pool volume), which can inhibit the data of the page to which the required response performance is provided from being migrated to the pool volume (first pool volume) not satisfying the required response performance.

Third Embodiment

Figure 35:
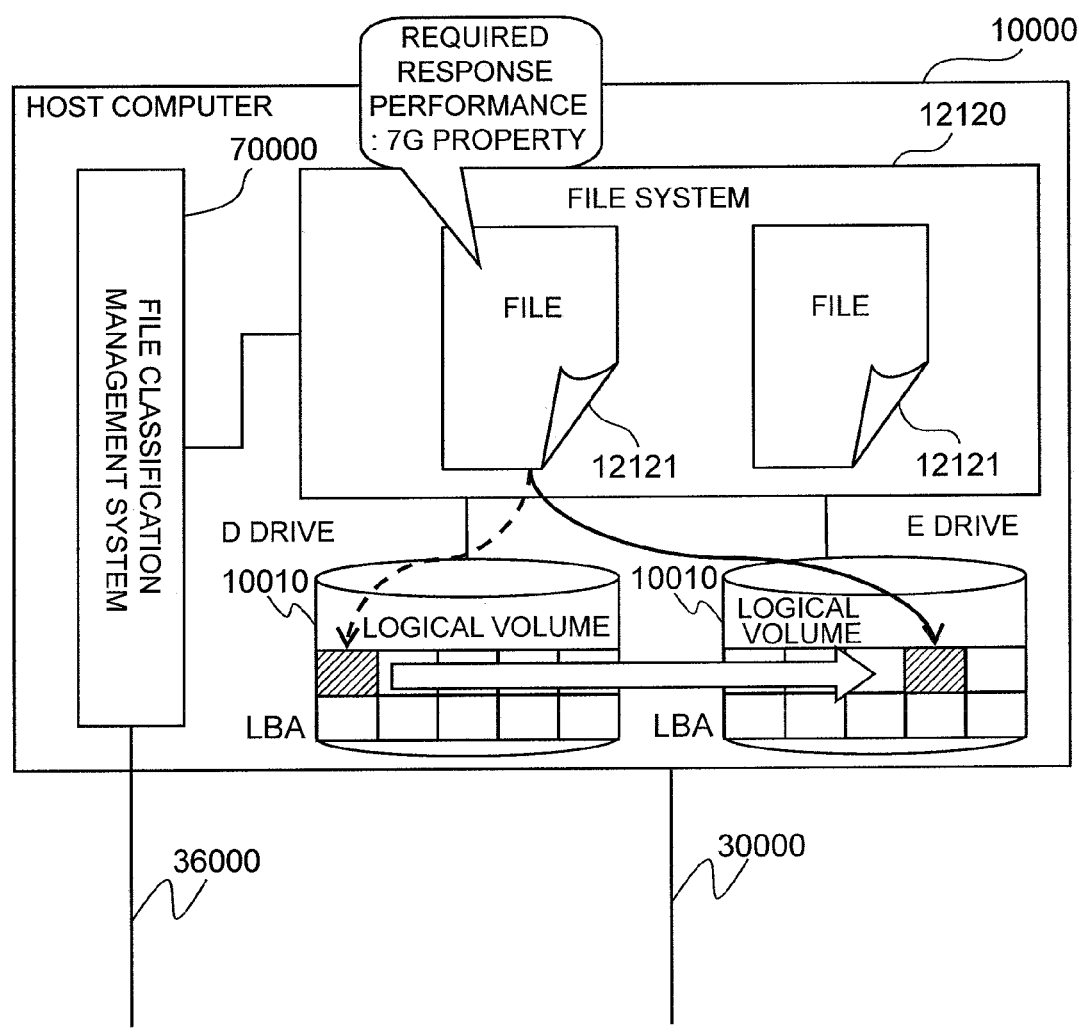
FIG. 35 is a conceptual diagram of a host computer in which a file classification management system exists in the third embodiment.

In the third embodiment, the details of the method in which, after performing the flow in the first embodiment for at least once, as shown in FIG. 35, the file classification management system 70000 of the host computer 10000 in the host computer 10000 notifies that the file 12121 is migrated to the storage management system 23210, and the storage management system 23210, receiving the notification, extracts the required response performance of the file to be migrated 12121, migrates the page in which the actual data of the migration destination file 12121 is stored to the pool volume satisfying the required response performance, which inhibits the page in which the actual data of the migration destination file 12121 is stored from being migrated to the pool volume not satisfying the required response performance are described.

The file classification management system 70000, in accordance with the property (e.g. access status) and the property value for file classification which are specified by the administrator, sets the property value for the file 12121, and migrates the file 12121 in accordance with the property.

Figure 36:
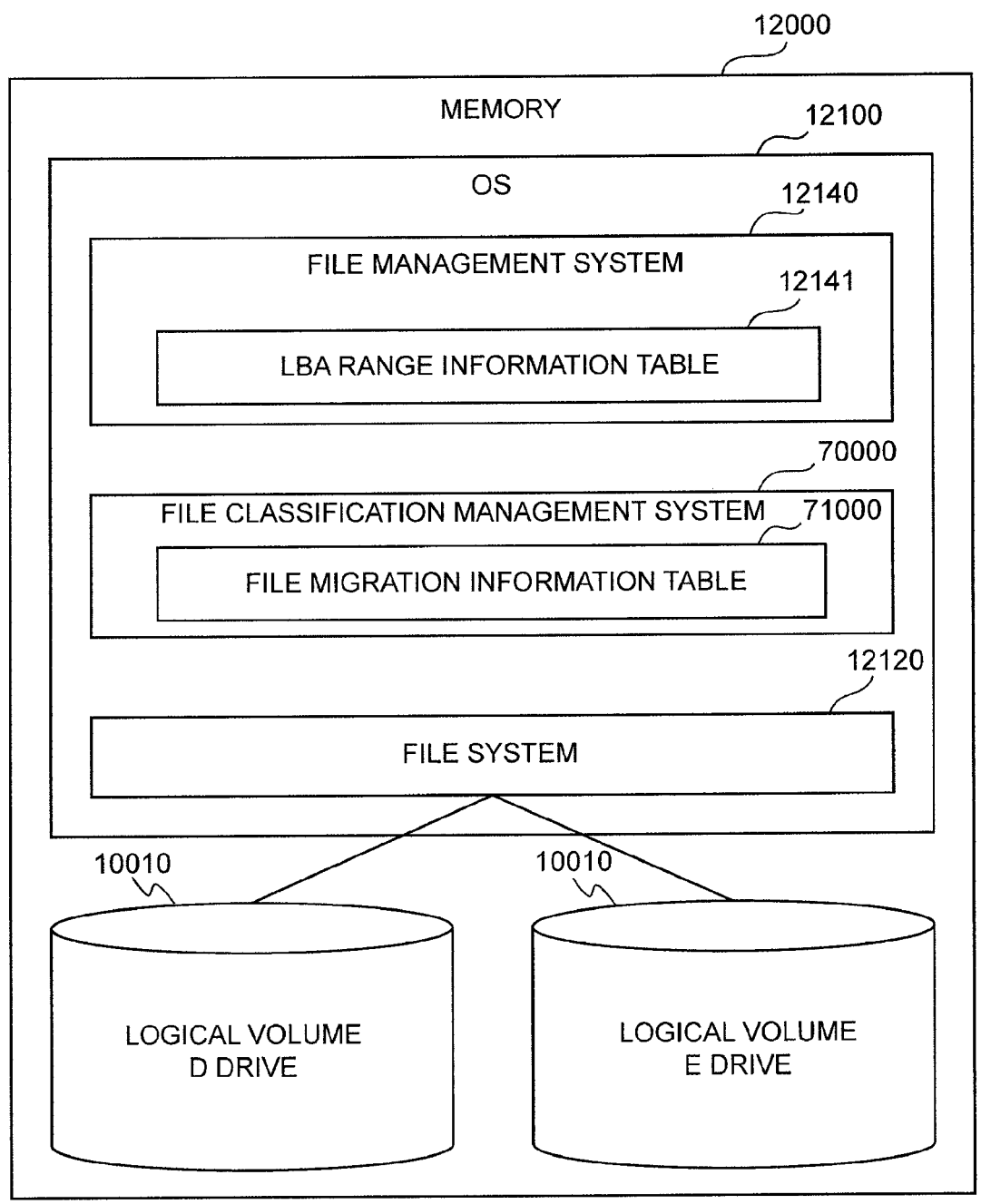
FIG. 36 is a logical configuration diagram of a memory of the host computer in the third embodiment.

FIG. 36 shows an example of the logical configuration of the memory 12000 in the host computer 10000. In the memory 12000, the OS 12100 is stored. In the OS 12100, the file management system 12140, the file system 12120, and the file classification management system 70000 operate. The file management system 12140 of the OS 12100 stores the file in the multiple logical volumes 10010 provided by the storage apparatus 20000 and assigned to the different drives. The file classification management system 70000, in accordance with the user-defined property value provided to the file which the file management system 12140 manages, migrates the file, and generates the file migration information table 71000. The file management system 12140 comprises the LBA Range information table 12141 which manages the LBA storing the file. The details of the file migration information table 71000 are described later.

FIG. 37 shows a configuration example of the file migration information table 71000 which the file classification management system 70000 generates when performing the file migration. The file migration information table 71000 includes a migration source file information field 71100 to be the information by which the migration source file can be uniquely identified and a migration destination file information field 71200 to be the information by which the migration destination file can be uniquely identified.

The migration source file information field 71100 is configured of a host name field 71110, a drive name field 71120, a directory name field 71130, and a file name field 71140, and includes the host name, the drive name, the directory name, and the file name as the file information related to the migration source file. The migration destination file information field 71200 is configured of a host name field 71210, a drive name field 71220, a directory name field 71230, and a file name field 71240, and includes the host name, the drive name, the directory name, and the file name as the file information related to the migration destination file.

Figure 38:
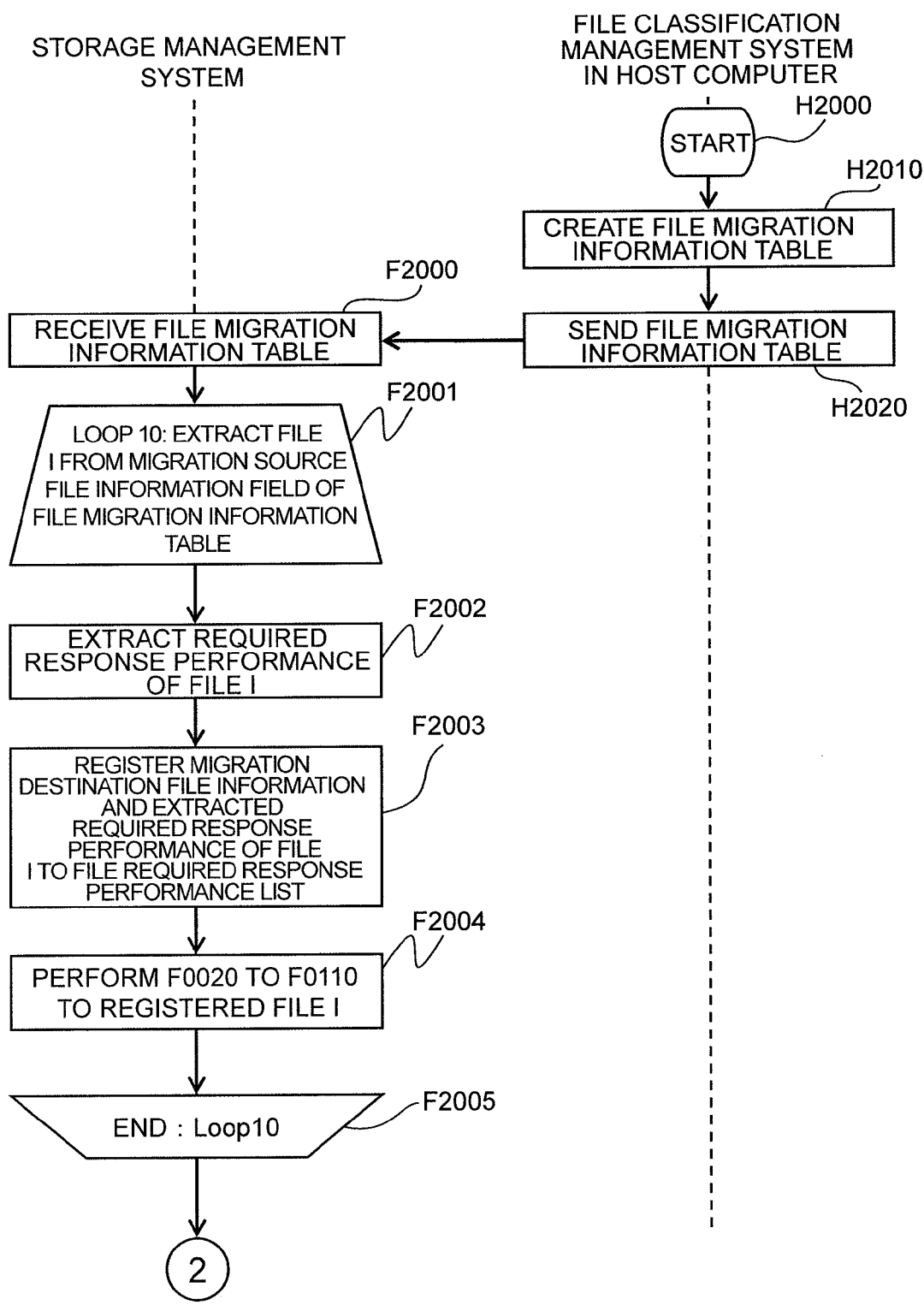
FIG. 38 is a flowchart in which the storage management system in the third embodiment, in accordance with the file migration information received from the file classification management system, extracts the required response performance of each page.

FIG. 38 shows a flowchart of the method by which the file classification management system 70000 notifies the file migration to the storage management system 23210, and the storage management system 23210 extracts the required response performance of the pre-migration file and assumes the same to be the required response performance of the post-migration file.

Firstly, the file classification management system 70000 sets the property value for the file in accordance with the property and the property value for file classification which are specified by the administrator, migrates the file in accordance with the property, and the flow is started (H2000).

Next, the file classification management system 70000 generates the file migration information table 71000 (H2010), and sends the created file migration information table 71000 to the storage management system 23210 (H2020).

Next, the storage management system 23210, through the processing of Loop 10 in steps F2001 to F2004, extracts the required response performance of the pre-migration file, and assumes the same to be the required response performance of the post-migration file.

As more specifically described, the storage management system 23210, if receiving the file migration information table 71000 from the file classification management system 70000 of the host computer 10000, extracts a file i registered in the migration source file information field of the received file migration information table 71000 (F2001).

Next, the storage management system 23210 extracts the required response performance of the file with which the host name, the drive name, the directory name, and the file name of the file i are consistent from the file required response performance list 23270 shown in FIG. 11 (F2002), and registers the host name, the drive name, the directory name, and the file name registered in the migration destination file information field of the file i in the file migration information table 71000 to the file required response performance list 23270 (F2003).

Next, the storage management system 23210, assuming the registered file i to be a file a, performs steps F0047 to F0110 (F2004), proceeds to step F2005, at step F2005, assumes that the processing of Loop 10 for the file i is completed, selects the file which is registered in the file migration information table 71000 and for which Loop 10 is not performed yet, returns to F2001 assuming the same to be the file i, and performs the processing of Loop 10 for all the files registered in the file migration information table 71000.

Figure 18:
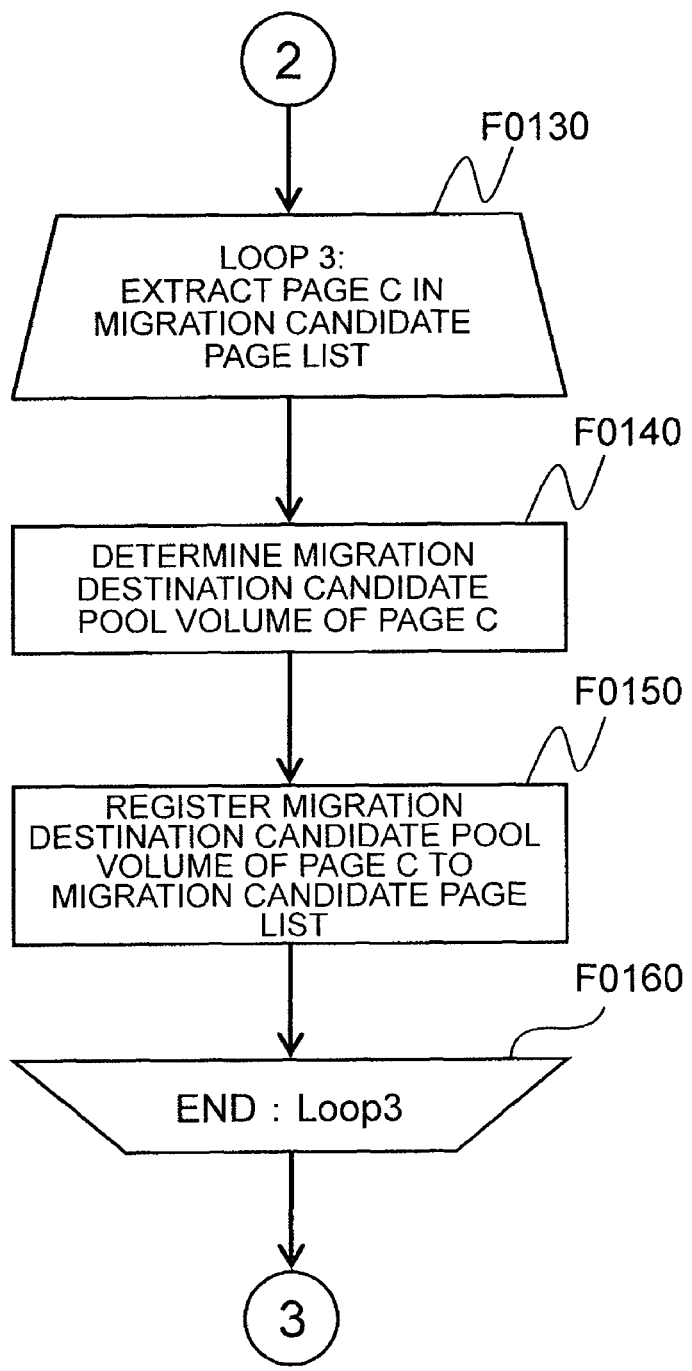
FIG. 18 is a flowchart of creating restrictions on page migration and normal migration in the first embodiment.

Subsequently, the storage management system 23210, by performing the processing from step F0130 shown in FIG. 18 to step F0340 shown in FIG. 20, can manage the information related to the migration source file as the information related to the migration destination file, therefore can migrate the page to which the required response performance is provided to the pool volume satisfying the required response performance, and can inhibit the page to which the required response performance is provided from being migrated to the pool volume not satisfying the required response performance.

That is, the storage management system 23210 can store the required response performance which is provided to the file specified by the access request, if the file migration is instructed by the access request source, assumes the file which already exists to be the migration source file, manages the file to be the migration destination of the migration source file as the migration destination file and the stored required response performance as the required response performance of the migration source file and as the required response performance of the migration destination file, at the same time, newly sets the page for storing the actual data of the migration destination file, manages the same as the migration destination page, assigns a new pool volume (third pool volume) to the migration destination page, and migrates the data of the migration source file to the copy destination page.

Note that steps F0130 to F0340 are already described, and therefore the description is omitted.

According to this embodiment, it is possible to migrate the page in which the actual data of the migration destination file 12121 is stored to the pool volume (third pool volume) satisfying the required response performance and inhibit the page in which the actual data of the migration destination file 12121 is stored from being migrated to the pool volume not satisfying the required response performance.

Note that, in the respective embodiments, if multiple pools exist as the pools storing the multiple pool volumes, the pool volumes of the respective pools can also be managed collectively.

REFERENCE SIGN LIST

10000: Host computer
11000: Processor
12000: Memory
12141: LBA Range information table
12130: Application management system
12140: File management system
12250: VM LBA Range information table
12260: VM volume management table
12900: Agent
12910: LBA correspondence table
13000: Disk
14000: Communication I/F
15000: Management I/F
16000: Internal network
20000: Storage apparatus
21000: FEPK (Front End PacKage)
22000: BEPK (Back End PacKage)
23000: MPPK (Micro Processor PacKage)
23210: Storage management system
23220: Virtual volume management table
23230: Pool management table
23240: Page migratable pool volume list
23250: Pool volume management table
23270: File required response performance list
23279: VM file required response performance list
23280: Page migration candidate list
23290: Pool volume free capacity estimation table
24000: CMPK (Cache Memory PacKage)
25000: Externally-connected storage apparatus
30000: IP/SAN
35000: SAN
36000: Management network
40000: Management terminal
50000: Input information
70000: File classification management system
71000: File migration information table

The invention claimed is:

1. A storage apparatus connected to an access request terminal via a communication network, the storage apparatus being an access request source, the storage apparatus comprising:
  a plurality of types of storage devices, each of the plurality of types of storage devices having a different response performance; and
  a controller configured to:
    provide at least one pool volume from each of the plurality of types of storage devices;
    divide a virtual storage area of a virtual volume into a plurality of blocks,
    wherein the virtual volume includes the virtual storage area as an access target of the access request source; and
    manage each of the plurality of blocks by associating each of the plurality of blocks with a storage area formed in the at least one pool volume, the storage area being a page allocated for the virtual storage area for storing real data of a file designated in an access request from the access request source,
  wherein the controller:
    receives a request from the access request source, the request designating a file and a required response performance set for the designated file,
    wherein the real data of the designated file has an access frequency, the access frequency of the data being different from the required response performance set for the designated file;
    compares the required response performance set for the file designated in the request, and a response performance of a first pool volume of the associated page for storing the real data of the file designated in the request when the required response performance set for the file designated in the request is included in the request;
    selects a pool volume satisfying the required response performance, as a second pool volume, when the response performance of the first pool volume does not satisfy the required response performance;
    migrates the real data stored in the page in the first pool volume, to the selected second pool volume; and
    stores the real data of the file designated in the request, in a page in the second pool volume.

2. The storage apparatus according to claim 1,
wherein the controller:
  manages the response performance of each of the plurality of types of storage devices by associating the response performance of each of the plurality of types of storage devices with a respective logical volume of the plurality of logical volumes configuring a logical storage area of the plurality of types of storage devices;
  allocates a storage area of a logical volume of the plurality of logical volumes formed in one type of storage device, to each page, as the pool volume;
  compares a required response performance of each page, and the response performance of each first pool volume of each associated page when the real data of the file is divided into a plurality of pages;
  selects the pool volume satisfying the required response performance, as the second pool volume, by associating the second pool volume with the storage area formed in the at least one pool volume, as each page;
  migrates the real data stored in each page in each first pool volume, to each selected second pool volume; and
  stores the real data of the file designated in the request, in each page in each second pool volume.

3. The storage apparatus according to claim 1,
wherein the controller:
  manages the response performance of the plurality of types of storage devices by associating the response performance of the plurality of types of storage devices with the plurality of logical volumes configuring the logical storage area of the plurality of types of storage devices;

allocates the storage area of the logical volume among the plurality of logical volumes formed in the one type of storage device, to each page, as the pool volume;

compares the required response performance required of each page, and the response performance of each first pool volume of each associated page when the real data of the file is divided into the plurality of pages;

selects the pool volume satisfying the required response performance, and selects the pool volume in which a response time as the response performance is the fastest, as the second pool volume, when the response performance of each first pool volume does not satisfy the required response performance;

migrates the real data stored in each page in each first pool volume, to each selected second pool volume; and stores the real data of the file designated in the request, in each page in each second pool volume.

4. The storage apparatus according to claim 1, wherein, when the controller selects two or more pool volumes satisfying the required response performance, the controller selects a pool volume of the selected two or more pool volumes in which the response time as the response performance is the slowest, as the second pool volume.

5. The storage apparatus according to claim 1, wherein the controller:

upon receiving, from the access request source, notification to an effect of changing the storage area of the page for storing the real data of the file, and a command for re-execution, requests the access request source to send an access request including information concerning the storage area of the changed page; and upon receiving, from the access request source, the access request including the information concerning the storage area of the changed page, compares required response performance of the storage area of the page changed with the access request, and response performance of a new first pool volume of the associated storage area of the page changed with the access request, selects a pool volume satisfying the required response performance, as a new second pool volume on condition that the response performance of the new first pool volume does not satisfy the required response performance, migrates the real data stored in the page in the new first pool volume, to the selected new second pool volume, and stores the real data of the file designated in the access request in the page in the new second pool volume.

6. The storage apparatus according to claim 1, wherein the controller:

upon receiving, from the access request source, the notification to the effect of changing the storage area of the page for storing the real data of the file, and the command for the re-execution, and the information concerning the storage area of the changed page, compares required response performance of the storage area of the page changed with the notification, and the response performance of the new first pool volume of the associated storage area of the page changed with the notification, selects the pool volume satisfying the required response performance, as the new second pool volume, on the condition that the response performance of the new first pool volume does not satisfy the required response performance, migrates the real data stored in the page in the new first pool volume, to the selected new second pool volume, and stores the real data of the file designated in the access request in the page in the new second pool volume.

7. The storage apparatus according to claim 1, wherein the controller:

stores required response performance concerning the page designated in the access request; and upon receiving, from the access request source, notification to an effect of changing the storage area of the page designated in the access request, and the command for the re-execution, compares required response performance of the stored page, and the response performance of the new first pool volume of the associated storage area of the page changed with the notification, selects the pool volume satisfying the required response performance, as the new second pool volume, on the condition that the response performance of the new first pool volume does not satisfy the required response performance, migrates the real data stored in the page in the new first pool volume, to the selected new second pool volume, and stores the real data of the file designated in the access request in the page in the new second pool volume.

8. The storage apparatus according to claim 1, wherein the controller:

stores required response performance concerning the file designated in the request; and when a command for migrating the file is given from the access request source, sets an existing file as a migration source file, and sets a file to become a migration destination of the migration source file, as a migration destination file, manages the stored required response performance as a required response performance of the migration source file, and required response performance of the migration destination file, sets a new page for storing real data of the migration destination file and manages the new page, as a migration destination page, allocates a third pool volume, as a new pool volume, to the migration destination page, and migrates real data of the migration source file, to the migration destination page.

9. A method for controlling a storage apparatus comprising:

a plurality of types of storage devices with different response performance; and a controller configured to:

provide at least one pool volume from each of the plurality of types of storage devices;

divide a virtual storage area of a virtual volume into a plurality of blocks, wherein the virtual volume includes the virtual storage area as an access target of an access request source; and manage each of the plurality of blocks by associating each of the plurality of blocks with a storage area formed in the at least one pool volume, the storage area being a page allocated for the virtual storage area for storing real data of a file designated in an access request from the access request source, wherein the controller:

receives a request from the access request source, the request designating a file and a required response performance set for the designated file, wherein the real data of the designated file has an access frequency, the access frequency of the data being different from the required response performance set for the designated file;

compares the required response performance set for the file designated in the request, and a response performance of a first pool volume of the associated page for storing the real data of the file designated in the request when the required response performance set for the file designated in the request is included in the request;

selects a pool volume satisfying the required response performance, as a second pool volume, when the response performance of the first pool volume does not satisfy the required response performance;

migrates the real data stored in the page in the first pool volume, to the selected second pool volume; and stores the real data of the file designated in the request, in a page in the second pool volume.

10. The method for controlling the storage apparatus according to claim 9, wherein the controller:

manages the response performance of the plurality of types of storage devices by associating the response performance of the plurality of types of storage devices with a plurality of logical volumes configuring a logical storage area of the plurality of types of storage devices;

allocates a storage area of a logical volume among the plurality of logical volumes formed in one type of storage device, to each page, as the pool volume;

compares a required response performance of each page, and the response performance of each first pool volume of each associated page when the real data of the file is divided into a plurality of pages;

selects the pool volume satisfying the required response performance, and selects the pool volume in which a response time as the response performance is the fastest, as the second pool volume, when the response performance of each first pool volume does not satisfy the required response performance;

migrates the real data stored in each page in each first pool volume, to each selected second pool volume; and stores the real data of the file designated in the request, in each page in each second pool volume.

11. The method for controlling the storage apparatus according to claim 9, wherein, when the controller selects two or more pool volumes satisfying the required response performance, the controller selects a pool volume of the selected two or more pool volumes in which the response time as the response performance is the slowest, as the second pool volume.

12. The method for controlling the storage apparatus according to claim 9, wherein the controller:

upon receiving, from the access request source, notification to an effect of changing the storage area of the page for storing the real data of the file, and a command for re-execution, requests the access request source to send an access request including information concerning the storage area of the changed page; and upon receiving, from the access request source, the access request including the information concerning the storage area of the changed page, compares a required response performance of the storage area of the page changed with the access request, and a response performance of a new first pool volume of the allocated storage area of the page changed with the access request, selects a pool volume satisfying the required response performance, as a new second pool volume, when the response performance of the new first pool volume does not satisfy the required response performance, migrates the real data stored in the page in the new first pool volume, to the selected new second pool volume, and stores the real data of the file designated in the request in the page in the new second pool volume.

13. The method for controlling the storage apparatus according to claim 9, wherein the controller:

upon receiving from the access request source, the notification to the effect of changing the storage area of the page for storing the real data of the file, the command for the re-execution, and the information concerning the storage area of the changed page, compares a required response performance of the storage area of the page changed with the notification, and the response performance of the new first pool volume of the associated storage area of the page changed with the notification, selects the pool volume satisfying the required response performance, as the new second pool volume, when the response performance of the new first pool volume does not satisfy the required response performance, migrates the real data stored in the page in the new first pool volume, to the selected new second pool volume, and stores the real data of the file designated in the request in the page in the new second pool volume.

14. The method for controlling the storage apparatus according to claim 9, wherein the controller:

stores a required response performance concerning the page designated in the access request; and upon receiving, from the access request source, notification to an effect of changing the storage area of the page designated in the access request, and the command for the re-execution, compares required response performance of the stored page, and the response performance of the new first pool volume of the associated storage area of the page changed with the notification, selects the pool volume satisfying the required response performance, as the new second pool volume, on the condition that the response performance of the new first pool volume does not satisfy the required response performance, migrates the real data stored in the page in the new first pool volume, to the selected new second pool volume, and stores the real data of the file designated in the request in the page in the new second pool volume.

15. The method for controlling the storage apparatus according to claim 9, wherein the controller:

stores required response performance concerning the file designated in the request; and when a command for migrating the file is given from the access request source, sets an existing file, as a migration source file, and sets a file to become a migration destination of the migration source file, as a migration destination file, manages the stored required response performance, as a required response performance of the migration source file, and required response performance of the migration destination file, sets a new page for storing real data of the migration destination file and manages the new page, as a migration destination page, allocates a third pool volume, as a new pool volume, to the migration destination page, and migrates real data of the migration source file, to the migration destination page.

* * * * *